United States Patent

Yano et al.

[11] Patent Number: 6,015,455
[45] Date of Patent: Jan. 18, 2000

[54] INK JET RECORDING INK AND INK JET RECORDING METHOD

[75] Inventors: Toshiyuki Yano; Hitoshi Kojima; Eisuke Hiraoka; Akihiko Chujo; Kaoru Watanabe; Hiromi Nagai; Yasuharu Endo; Ken Hashimoto, all of Minami-Ashigara, Japan

[73] Assignee: Fuji Xerox Co., Ltd., Tokyo, Japan

[21] Appl. No.: 08/909,771

[22] Filed: Aug. 12, 1997

[30] Foreign Application Priority Data

Aug. 21, 1996 [JP] Japan .................... 8-219998

[51] Int. Cl.<sup>7</sup> .................................... C09D 11/02
[52] U.S. Cl. ........................ 106/31.58; 106/31.43; 106/31.47; 106/31.48; 106/31.49; 106/31.52
[58] Field of Search .................. 106/31.58, 31.43, 106/31.52, 31.49, 31.47, 31.48

[56] References Cited

U.S. PATENT DOCUMENTS

| 5,089,050 | 2/1992 | Vieira et al. | 106/31.58 |
| 5,261,953 | 11/1993 | Vieira et al. | 106/31.58 |
| 5,431,720 | 7/1995 | Nagai et al. | 106/31.58 |
| 5,451,251 | 9/1995 | Mafune et al. | 106/31.48 |
| 5,478,383 | 12/1995 | Nagashima et al. | 106/31.58 |
| 5,509,957 | 4/1996 | Toan et al. | 106/31.58 |

FOREIGN PATENT DOCUMENTS

| 2-29687 | 1/1990 | Japan . |
| 2-255876 | 10/1990 | Japan . |
| 3-91577 | 4/1991 | Japan . |
| 4-226175 | 8/1992 | Japan . |
| 4-233975 | 8/1992 | Japan . |
| 4-270286 | 9/1992 | Japan . |
| 4-279671 | 10/1992 | Japan . |
| 6-93196 | 4/1994 | Japan . |
| 264015 | 9/1994 | Japan . |
| 7-26178 | 1/1995 | Japan . |
| 7-150086 | 6/1995 | Japan . |
| 7-166116 | 6/1995 | Japan . |

*Primary Examiner*—Helene Klemanski
*Attorney, Agent, or Firm*—Oliff & Berridge, PLC

[57] ABSTRACT

An ink jet recording ink comprising: (i) water, (ii) a water-soluble organic solvent, (iii) at least one dye having at least one carboxyl group in the form of a free acid, (iv) a substituted aromatic compound represented by general formula (I); and (v) at least one alkali metal hydroxide, wherein the pH value of the ink is from 8 to 12, and an ink jet recording method in which such ink droplets are discharged from an orifice according to a recording signal to record an image using this ink jet recording ink are disclosed, general formula (I) being:

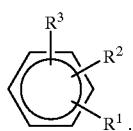

(I)

20 Claims, No Drawings

INK JET RECORDING INK AND INK JET RECORDING METHOD

BACKGROUND OF THE INVENTION

1. Field of the Invention

The present invention relates to an ink jet recording ink used in an ink jet recording apparatus, and to an ink jet recording method.

2. Description of the Related Art

In ink jet recording theory, a liquid or molten solid ink is discharged through nozzles, slits, porous film, and the like onto paper, cloth, film, and the like to record images. Various methods for discharging ink are suggested, such as the so-called charge-control method in which the ink is discharged using electrostatic attractive force, the drop-on-demand method (pressure-pulse method) in which ink is discharged using the vibration all pressure of a piezoelectric element, and the thermal ink jet method in which ink is discharged using pressure generated by forming and developing bubbles at high temperature, and the like. Images having extremely high resolution can be obtained using these methods.

The ink used in these ink jet recording methods include an aqueous dye ink obtained by dissolving various water-soluble dyes in a liquid medium composed of water and a water-soluble organic solvent, an aqueous pigment ink obtained by dispersing various pigments in a liquid medium composed of water and a water-soluble organic solvent, an oil-based dye ink obtained by dissolving an oil-soluble dye in an organic solvent, and the like.

Among these inks, aqueous ink with a dissolved aqueous dye is most frequently used as an ink jet recording ink. The first reason thereof is that the main solvent is water and so the aqueous ink is safe. Moreover, the second reason is that the color-developing properties of color images are excellent and printed images of high quality are obtained because a dye is used. Further, the third reason is that the ink has excellent storage stability.

However, when using aqueous inks using aqueous dyes as coloring agents, water resistance of printed images is poor.

Further, with the improvements in document productivity in offices, and the like, increases in printing speed are required and jetting frequency response in a high frequency driving range also becomes important in ink jet recording.

Various studies and developments have been carried out to improve water resistance and jetting frequency response of such aqueous dyes.

For example, Japanese Patent Application Laid-Open (JP-A) Nos. 2-29687 and 2-255876 suggest a method for improving the water resistance of ink by adding a polyamine to it. However, in the case of such an ink, the solubility stability of a dye becomes more easily lowered due to mutual action with the polyamine, and viscosity is increased because of the reaction of the polyamine over time. Therefore, clogging can occur and ink discharge stability decreases.

Further, JP-A Nos. 3-91577, 4-226175, 4-233975, 4-270286, 4-279671, and 6-93196 present a method for improving water resistance of ink by using a dye having a carboxyl group. However, in the case of such an ink, the dissolubility of a dye is reduced due to volatilization of water and/or an ammonium ion which is a counter ion. Clogging occurs and preservability of the ink tends to be lowered. Further, in the case of thermal ink jet recording, deposition on the surface of a heater referred to as "kogation" is occurs easily and changes in the discharge ability of ink increase over time.

To reduce these problems, which occur with an increase in water resistance, in JP-A No. 4-226175, there are methods suggested in which dyes with similar structures are mixed, a method in which a pH buffering agent is added to an ink, and method in which aphosphate is added. However, in these cases, even though pH can be stably maintained, the improvement in clogging is not sufficient, and the improvement in kogation which is a problem in thermal ink jet recording is also insufficient.

Also, JP-A No. 7-26178 suggests a method in which an alkaline metal compound is added to ink as a method which copes simultaneously with problems which occur with the improvement of water resistance and with the jetting frequency response. However, even though such an ink can improve clogging if the storage period is short, when the ink is stored for a long time, the solubility of a dye is decreased, and ink storage stability deteriorates. Further, jetting frequency response when high frequency is used is not satisfactory, and voids and white streaks occur easily. Moreover, the ink cannot improve kogation which is problematical in thermal ink jet recording.

Further, JP-A No. 7-166116 suggests an ink containing a combination of an amine compound and a substituted aromatic compound, and the like. However, in this case, since the dissolved condition of the substituted aromatic compound added is unstable, clogging tends to deteriorate, and the adhesion position of droplets during printing is disturbed so that image quality deterioration and other problems arise. At the same time, since the molecular weight of amine compounds added is high, the jetting frequency response is not satisfactory, and when driven at high frequency, voids and white streaks occur. Moreover, kogation which is problematical in thermal ink jet recording is not reduced.

As described above, no ink jet recording ink has been obtained which has superior water resistance and provides the various abilities required of an ink jet recording ink.

SUMMARY OF THE INVENTION

The object of the present invention is to provide an ink jet recording ink with superior water resistance, which provides a good image quality, which has excellent long-term ink storage stability, which has a sufficient nozzle clogging resistance, which has a sufficient jetting frequency response, and which does not reduce the amount discharged by kogation, and to provide an ink jet recording method using this ink.

The present inventors have studied the foregoing intensively and have found that the above-described object can be attended by an ink jet recording ink comprising water, a water-soluble organic solvent, at least one dye having at least one carboxyl group in the form of a free acid, a substituted aromatic compound represented by general formula (I) and at least one compound selected from alkali metal hydroxides, wherein the pH value thereof is from 8 to 12, and an ink jet recording method in which this ink jet recording ink is used and droplets thereof are discharged from an orifice according to recording signals to record images.

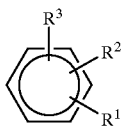

(I)

wherein, $R^1$ is a functional group selected from a carboxyl group, a sulfonic group, a salt of a carboxyl group, and a salt of a sulfonic group, $R^2$ is a functional group selected from hydrogen, a hydroxyl group, an amino group, a nitro group, a methyl group, an ethyl group, a carboxyl group, a sulfonic group, a salt of a carboxyl group, and a salt of a sulfonic group, and $R^3$ is a functional group selected from a hydrogen, a hydroxyl group, an amino group, a nitro group, a methyl group, and an ethyl group.

Though the action mechanism of the present invention is not known in detail, the mechanism we have surmised is as follows: A dye having a carboxyl group has high water resistance, but its free acid has relatively low solubility in water, and when the dye concentration increases by partial water evaporation at the tip of the nozzle, the dye easily precipitates and clogging tends to occur. However, ink of the present invention can retain solubility sufficient for practical use, even if a small amount of water evaporates. The reason for this is assumed to be that a specific substituted aromatic compound is selectively oriented at the tip of the nozzle, and under a high pH of not less than 8, dye is stabilized without precipitation by mutual action between a large amount of alkaline metal ions and a dye existing in the ink, and water evaporation is suppressed and clogging of nozzles and the like is reduced.

This is particularly true in the case in which the counter ion of the dye is a volatile ion such as ammonium.

Further, the reason for the occurrence of kogation which is problematical in thermal ink jet recording is believed to be that ionic dissociation of water in ink occurs due to the rapid increase in temperature near the heater, and therefore the hydrogen ion concentration of the ink increases locally, and as a result, the free acid of a dye having a carboxyl group forms and the dye precipitates. However, according to the present invention, because of the mutual action of a dye, a specific substituted aromatic compound and an alkaline metal ion, the solubility of the dye in the form of a free acid increases, and therefore, kogation can be limited.

Further, though it is assumed that jetting frequency response deteriorates with an increase in the kinetic viscosity of ink in a high frequency range, in the present invention, it is assumed that since the molecular weight of a component contained in the ink is small, the increase in kinetic viscosity of an ink in a high frequency range is small and so the jetting frequency response increases.

DETAILED DESCRIPTION OF THE PREFERRED EMBODIMENTS

The present invention will be described in detail below.

The dye used in the present invention is a dye having at least one carboxyl group in the form of a free acid. Examples of the counter ion of the dye include, but are not limited to, sodium ion, lithium ion, potassium ion, ammonium ion, alkanol ammonium ion such as triethanol ammonium ion. At least one ammonium ion is preferably contained as the counter ion from the viewpoint of improvement of water resistance. Preferable chemical structures of dyes in the form of a free acid are represented by general formulas (III) to (VIII). As the metal contained in the phthalocyanine nuclei of general formulas (IV) and (VII), Ni, Cu, Fe, Ti, V, and the like are preferable, but Cu is the most preferable. The preferable substituent R in dyes represented by general formulas (III) to (VIII) include hydrogen, an alkyl group having 1 to 5 carbon atoms, and a substituted alkyl group having 1 to 5 carbon atoms and substituted by a hydroxyl group or carboxyl group. The dyes represented by the general formulas (IX) to (XII) are further preferable.

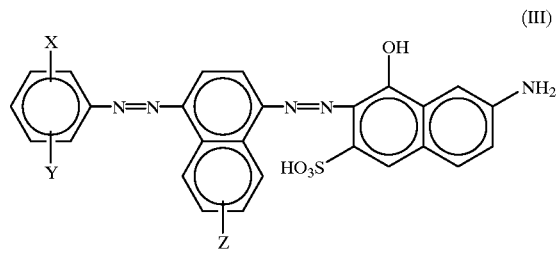

(III)

wherein X and Y are each hydrogen or a carboxyl group, Z is hydrogen, a carboxyl group or sulfonic group, and general formula (III) has one or more carboxyl groups.

$$Pc(SO_3H)_t(SO_2-NR^1-L-NR^2-X-NR^3-G)_q \qquad (IV)$$

wherein Pc is a phthalocyanine nucleus containing metal; $R^1$, $R^2$, and $R^3$ are each independently hydrogen, an alkyl group, substituted alkyl group, alkenyl group, substituted alkenyl group, aralkyl group, or substituted aralkyl group; L is a divalent organic bonding group; X is a carbonyl group or a group represented by the following formulas (1) to (3); G is a colorless organic group substituted by one or two groups selected from a mercaptocarbonyl group or carboxyl group; t+q is 3 to 4; q is 1 or more; and general formula (IV) has 1 or more carboxyl groups and 1 or more sulfonic groups; and the sum of the number of the mercaptocarbonyl groups and the number of the carboxyl groups is equal to or greater than the number of the sulfonic groups.

(1)

(2)

(3)

wherein in formulas (1) to (3), Z is $NR^4R^5$, $SR^6$, or $OR^6$; Y is hydrogen, chlorine, Z, $SR^7$, or $OR^7$; E is chlorine or a cyano group; $R^4$ and $R^5$ are each independently hydrogen, an alkyl group, substituted alkyl group, aryl group, substituted aryl group, aralkyl group, or substituted aralkyl group, or a group constituting a 5- or 6-member ring together with a nitrogen atom; and $R^6$ and $R^7$ are each independently hydrogen, an alkyl group, substituted alkyl group, aryl group, substituted aryl group, aralkyl group, or substituted aralkyl group.

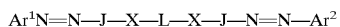

(V)

wherein J is a group represented by formula (1) described below; $Ar^1$ and $Ar^2$ are each independently an aryl group or substituted aryl group, at least one of $Ar^1$ and $Ar^2$ has at least one substituent selected from a mercaptocarbonyl group or carboxyl group; L is a divalent organic bonding group; X is a carbonyl group or a group represented by formulas (2) to (4) described below; and general formula (V) has 1 or more carboxyl groups and 1 or more sulfonic groups and the sum of the number of the mercaptocarbonyl groups and the number of carboxyl groups is equal to or greater than the number of sulfonic groups.

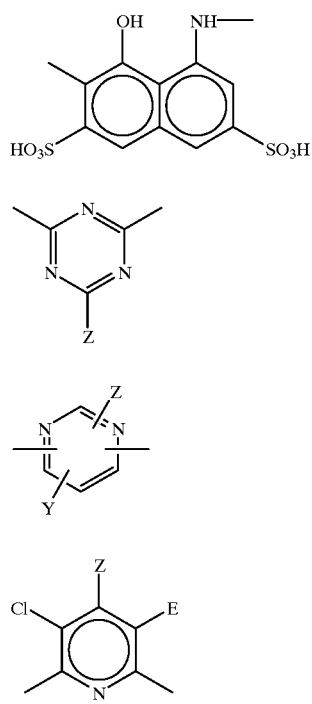

(1)

(2)

(3)

(4)

wherein, in formulas (2) to (4), Z is $NR^1R^2$, $SR^3$ or $OR^3$, Y is hydrogen, chlorine, Z, $SR^4$ or $OR^4$; E is chlorine or a cyano group; $R^1$ and $R^2$ are each independently hydrogen, an alkyl group, substituted alkyl group, alkenyl group, substituted alkenyl group, aralkyl group, or substituted aralkyl group or a group constituting a 5- or 6-member ring together with a nitrogen atom; and $R^3$ and $R^4$ are each independently hydrogen, an alkyl group, substituted alkyl group, alkenyl group, substituted alkenyl group, aralkyl group, or substituted aralkyl group.

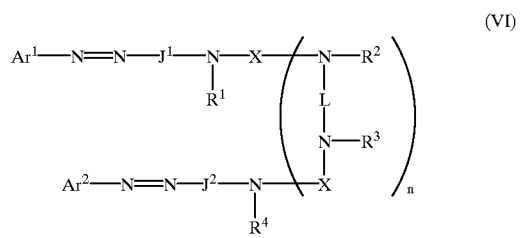

(VI)

wherein $Ar^1$ and $Ar^2$ are each independently an aryl group or substituted aryl group; at least one of $Ar^1$ and $Ar^2$ has at least one substituent selected from a mercaptocarbonyl group or carboxyl group; $J^1$ and $J^2$ are each independently a group represented by formulas (1) to (3) described below; $R^1$, $R^2$, $R^3$ and $R^4$ are each independently hydrogen, an alkyl group, or substituted alkyl group; L is a divalent organic bonding group; n is 0 or 1; X is independently a carbonyl group or a group represented by formulas (4) to (6) described below; and general formula (VI) has 1 or more carboxyl groups; and when general formula (VI) does not have a sulfonic group, the sum of the number of the mercaptocarbonyl groups and the number of the carboxyl groups is two or more and when general formula (VI) has a sulfonic group, the sum of the number of the mercaptocarbonyl groups and the number of the carboxyl groups is equal to or greater than the number of the sulfonic groups.

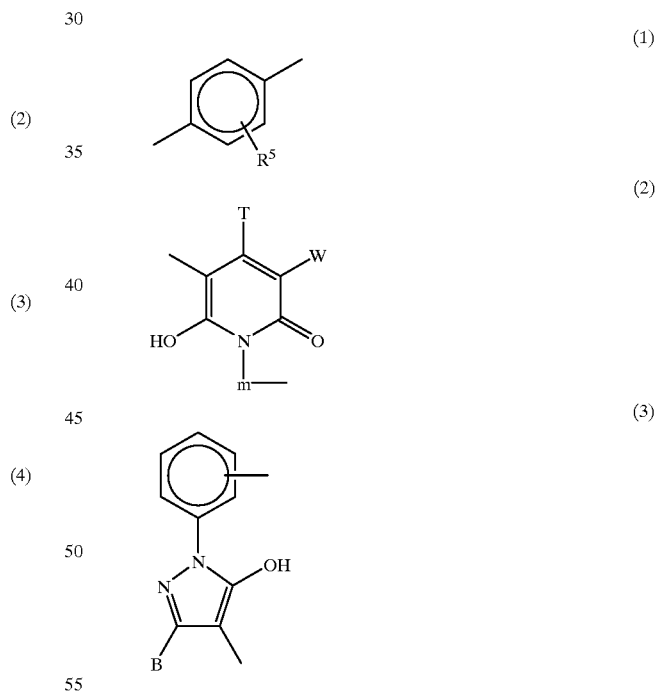

(1)

(2)

(3)

wherein in formulas (1) to (3), $R^5$ is a group selected from hydrogen, an alkyl group, substituted alkyl group, alkoxyhalogen, cyano group, ureido, or $NHCOR^6$; $R^6$ is hydrogen, an alkyl group, substituted alkyl group, aryl group, substituted aryl group, aralkyl group, or substituted aralkyl group; T is an alkyl group; W is a group selected from hydrogen, a cyano group, $CONR^{10}R^{11}$, pyridinium group, or carboxyl group; m is $C_2$ to $C_8$ alkylene chain; B is hydrogen, an alkyl group, or carboxyl group; and $R^{10}$ and $R^{11}$ are each independently hydrogen, an alkyl group, or substituted alkyl group.

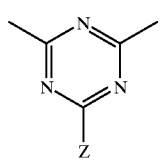
(4)

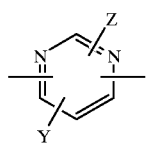
(5)

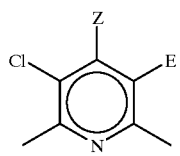
(6)

wherein in formulas (4) to (6); Z is $OR^7$, $SR^7$, or $NR^8R^9$; Y is hydrogen, chlorine, or a cyano group; E is chlorine or a cyano group; $R^7$ is hydrogen, an alkyl group, substituted alkyl group, alkenyl group, substituted alkenyl group, aryl group, substituted aryl group, aralkyl group, or substituted aralkyl group; $R^8$ and $R^9$ are each independently hydrogen, an alkyl group, substituted alkyl group, alkenyl group, substituted alkenyl group, aryl group, substituted aryl group, aralkyl group or substituted aralkyl group, or a group constituting a 5- or 6-member ring together with a nitrogen atom.

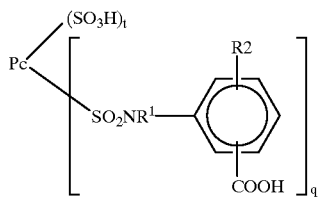
(VII)

wherein Pc is a phthalocyanine nucleus containing metal; $R^1$ is hydrogen, an alkyl group, substituted alkyl group, alkenyl group, substituted alkenyl group, aralkyl group, or substituted aralkyl group; $R^2$ is hydrogen, an alkyl group, alkoxyl group, halogen atom, amino group, or substituted amino group; t+q is 3 to 4; and q is 1 or more.

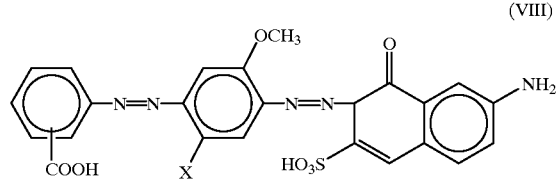
(VIII)

wherein, X is hydrogen, a carboxyl group, sulfonic group, alkyl group, substituted alkyl group, alkenyl group, substituted alkenyl group, aralkyl group, or substituted aralkyl group.

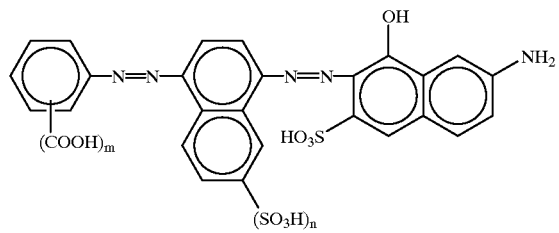
(IX)

wherein m is 1 or 2, and n is 0 or 1.

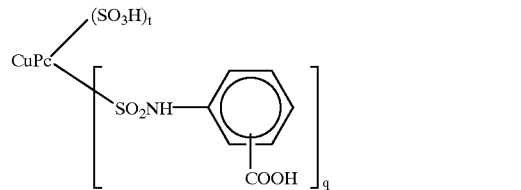
(X)

wherein CuPc is a phthalocyanine nucleus containing copper, and t+q is 3 to 4.

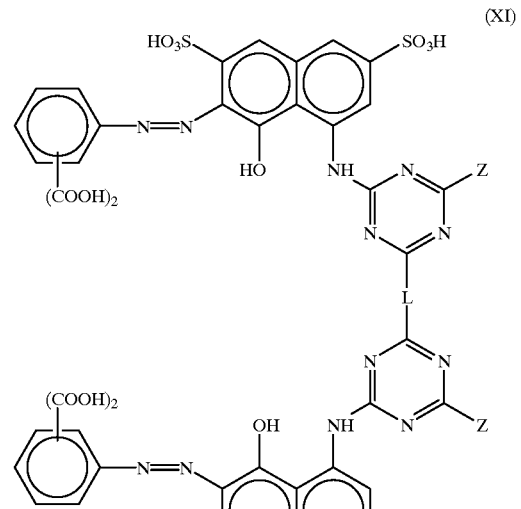
(XI)

wherein L is a divalent organic bonding group, Z is $NR^1R^2$, $SR^3$, or $OR^3$; $R^1$ and $R^2$ are each independently hydrogen, an alkyl group, substituted alkyl group, alkenyl group, substituted alkenyl group, aralkyl group, or substituted aralkyl group or a group constituting a 5- or 6-member ring together with a nitrogen atom, and $R^3$ is hydrogen, an alkyl group, substituted alkyl group, alkenyl group, substituted alkenyl group, aralkyl group, or substituted aralkyl group.

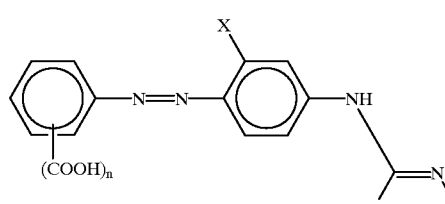

(XII)

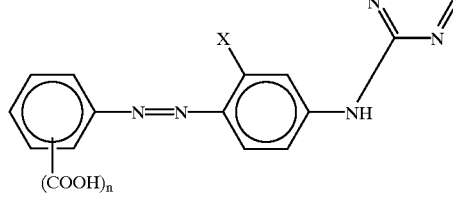

wherein n is 1 or 2; X is a group selected from hydrogen, an alkyl group, substituted alkyl group, alkoxyhalogen, cyano group, ureido, or $NHCOR^1$; $R^1$ is hydrogen, an alkyl group, substituted alkyl group, aryl group, substituted aryl group, aralkyl group, or substituted aralkyl group; Z is $OR^2$, $SR^2$, or $NR^3R^4$; $R^2$ is hydrogen, an alkyl group, substituted alkyl group, alkenyl group, substituted alkenyl group, aryl group, substituted aryl group, aralkyl group, substituted aralkyl group, alkenyl group, or substituted alkenyl group; $R^3$ and $R^4$ are each independently hydrogen, an alkyl group, substituted alkyl group, alkenyl group, substituted alkenyl group, aryl group, substituted aryl group, aralkyl group, or substituted aralkyl group or a group constituting a 5- or 6-member ring together with a nitrogen atom.

The specific examples of the preferred dyes shown below shall not be construed as a limitation upon those usable here.

Compound(III-1)

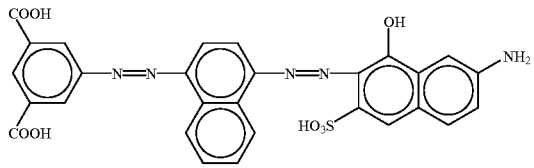

Compound(III-2)

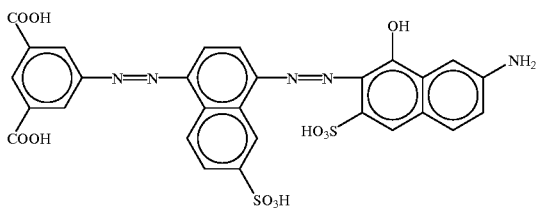

Compound(III-3)

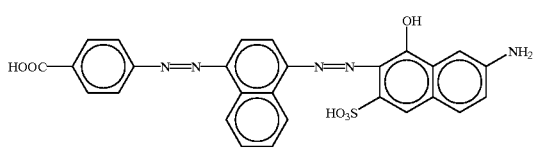

Compound(III-4)

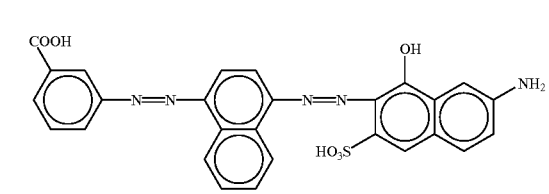

Compound(III-5)

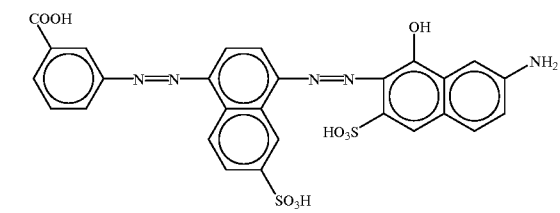

Compound(III-6)

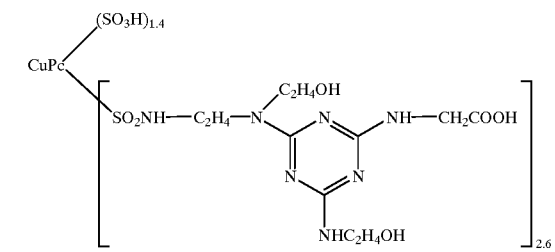

Compound(IV-1)

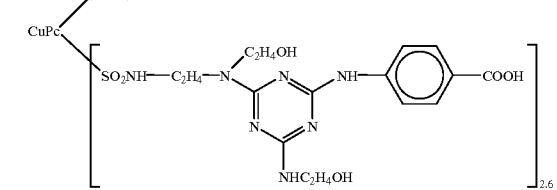

Compound(IV-2)

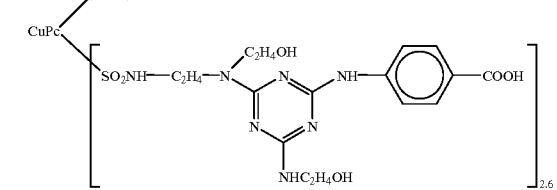

Compound(IV-3)
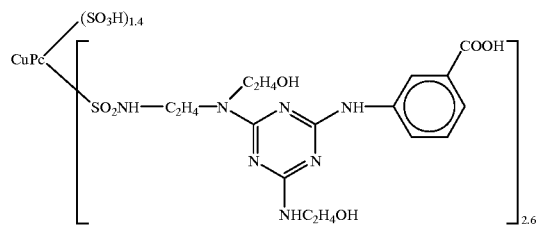
Compound(IV-8)
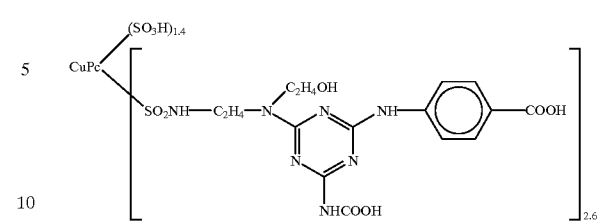
Compound(IV-4)
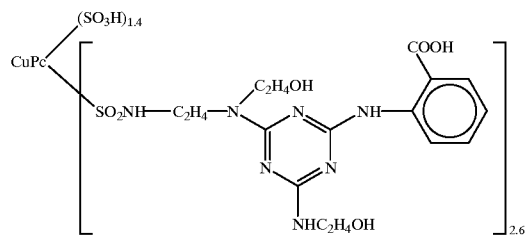
Compound(IV-9)
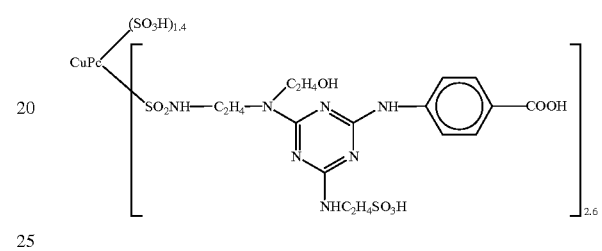
Compound(IV-5)
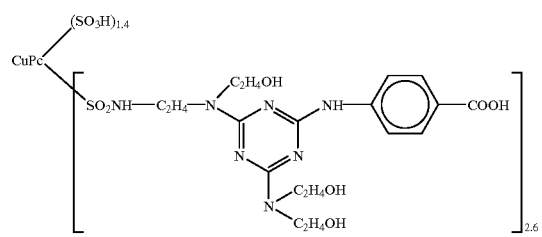
Compound(IV-10)
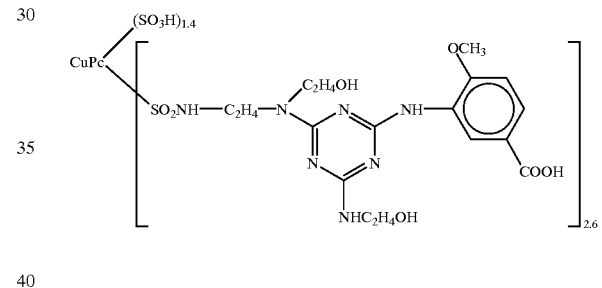
Compound(IV-6)
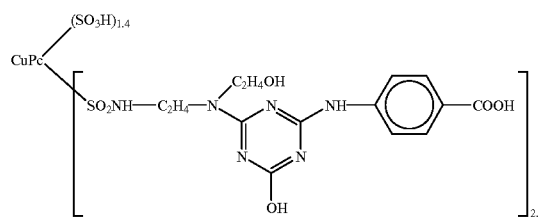
Compound(IV-11)
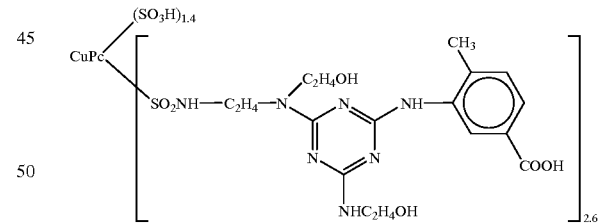
Compound(IV-7)
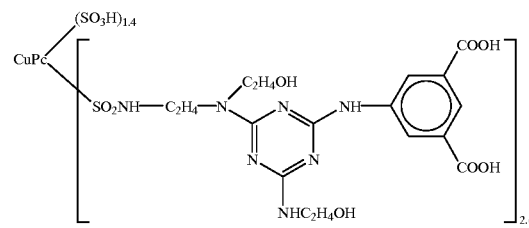
Compound(IV-12)
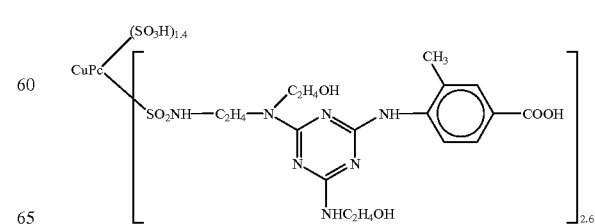

Compound(IV-13)
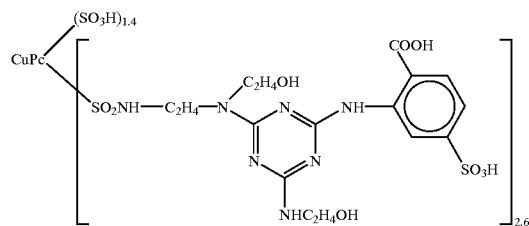
Compound(IV-14)
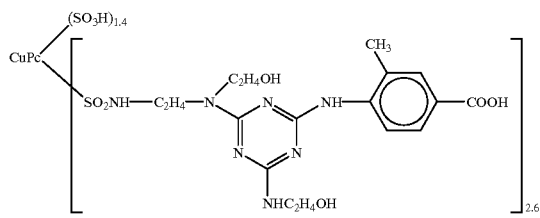
Compound(IV-15)
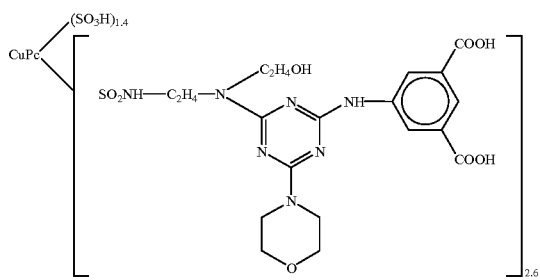
Compound(IV-16)
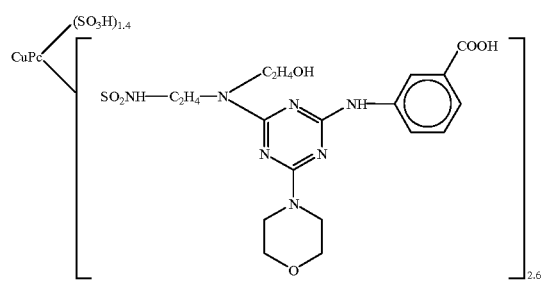
Compound(IV-17)
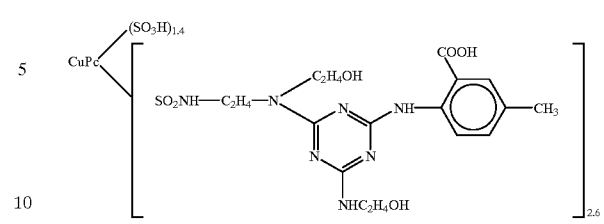
Compound(IV-18)
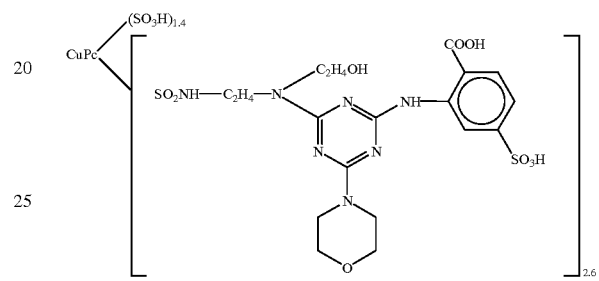
Compound(IV-19)
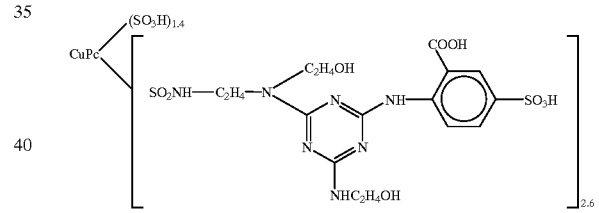
Compound(IV-20)
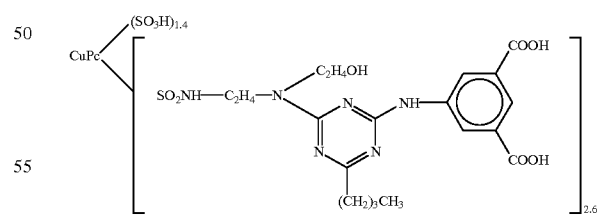

Compound(V-1)
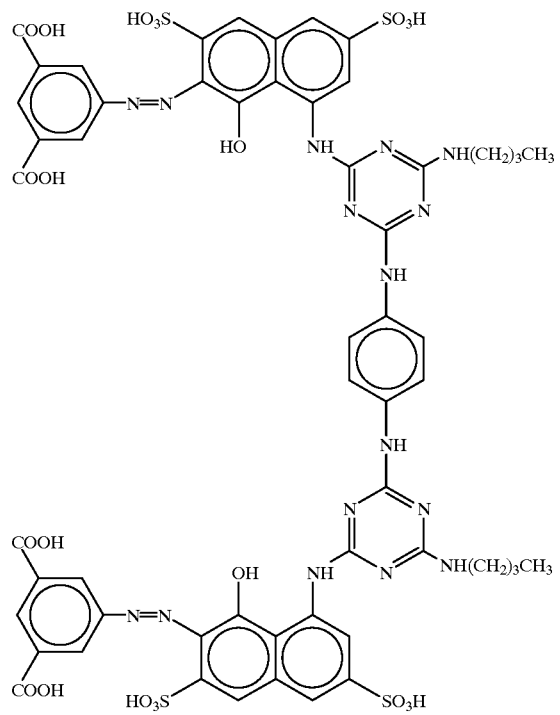
Compound(V-3)
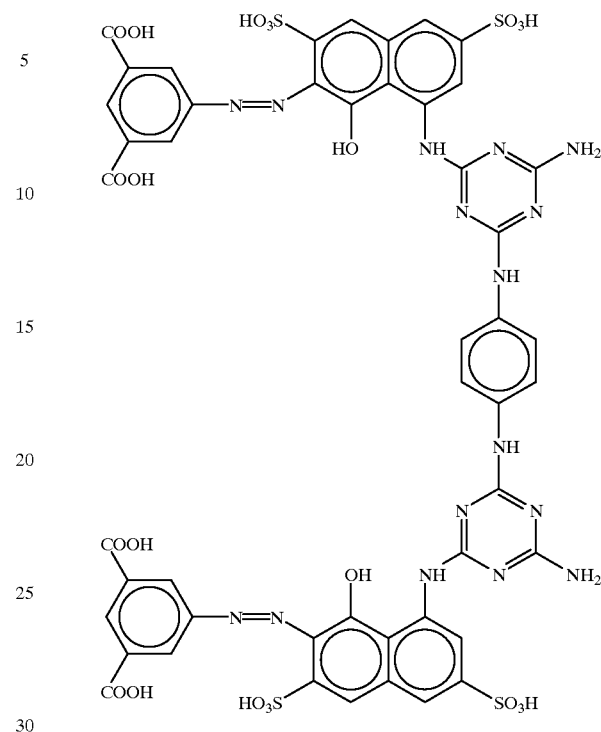
Compound(V-2)
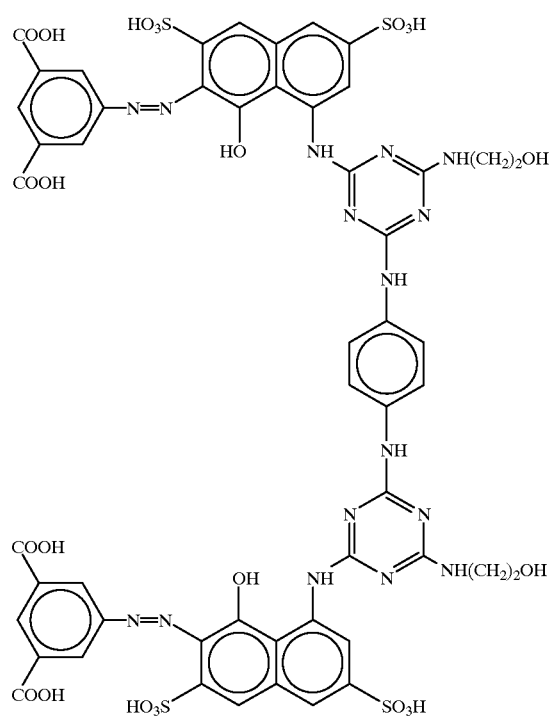
Compound(V-4)
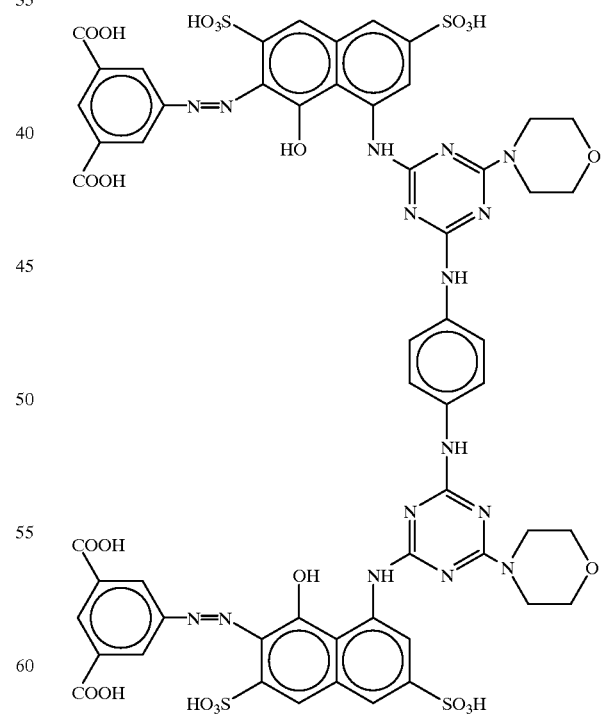

Compound(V-5)
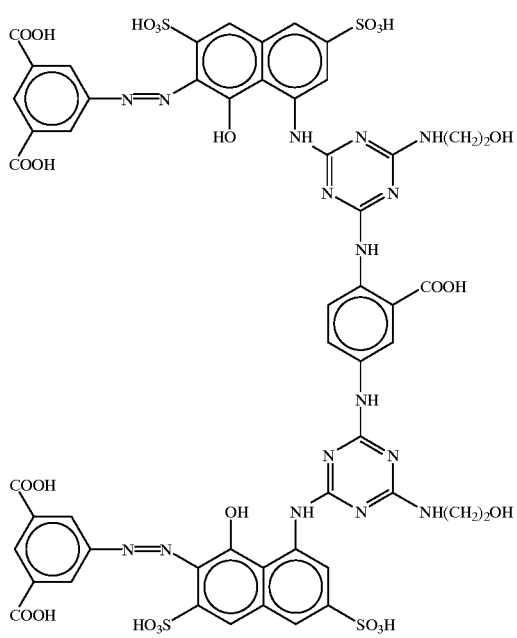
Compound(V-6)
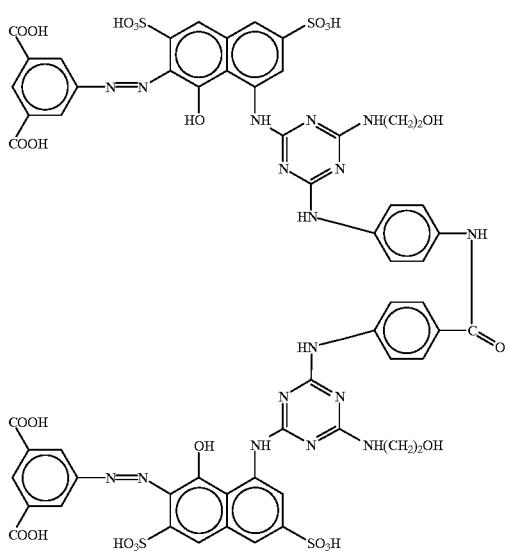
Compound(V-7)
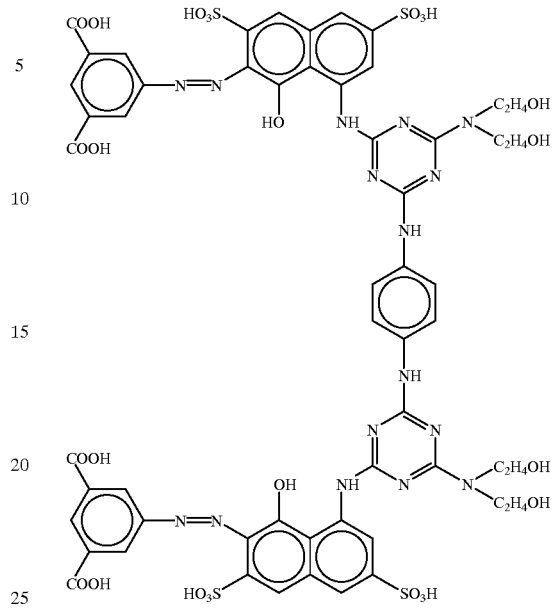
Compound(V-8)
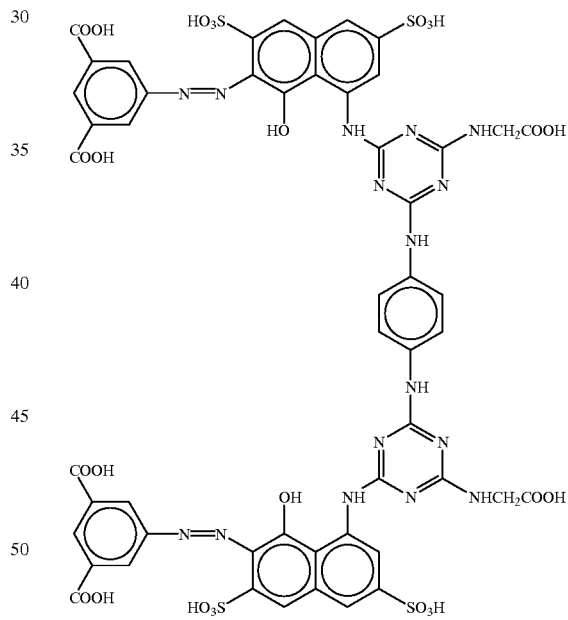

Compound(V-9)
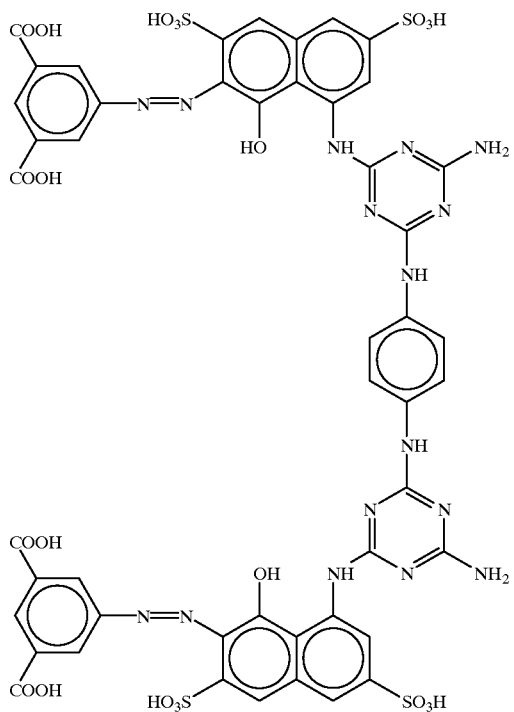
Compound(V-11)
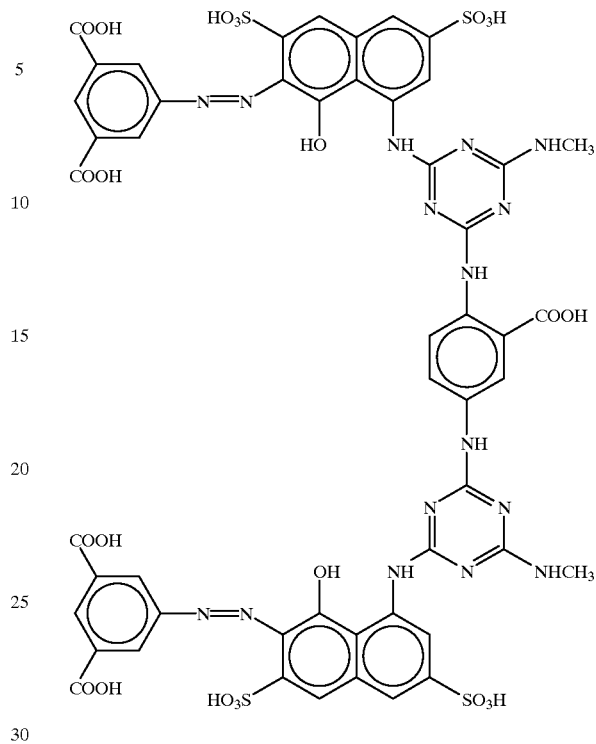
Compound(V-10)
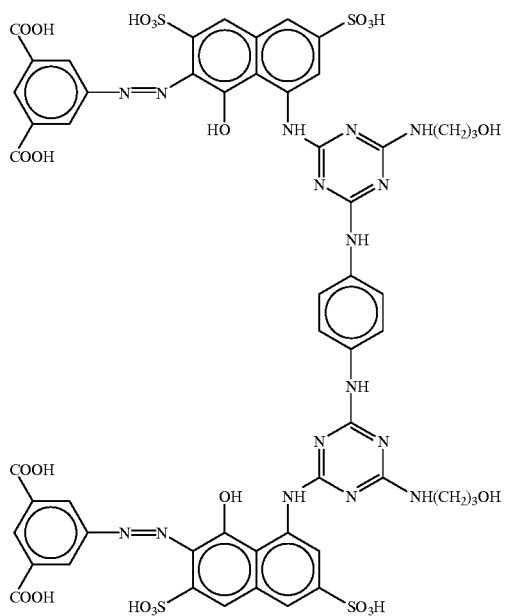
Compound(V-12)
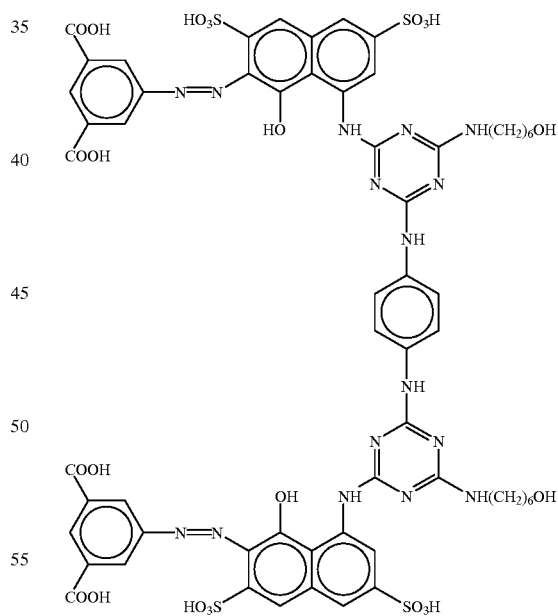

Compound(V-13)
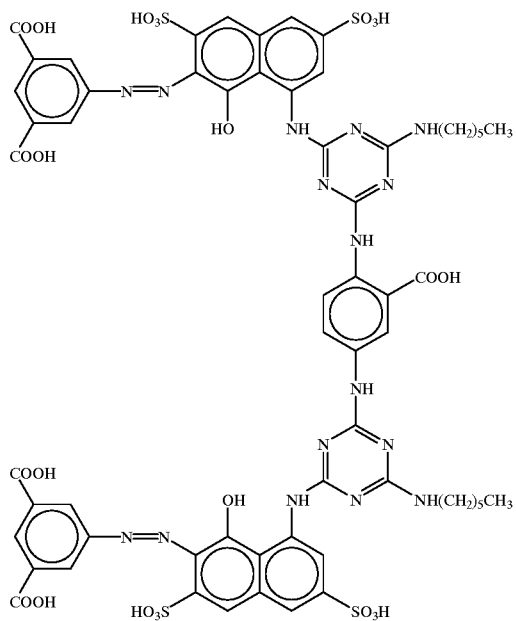
Compound(V-15)
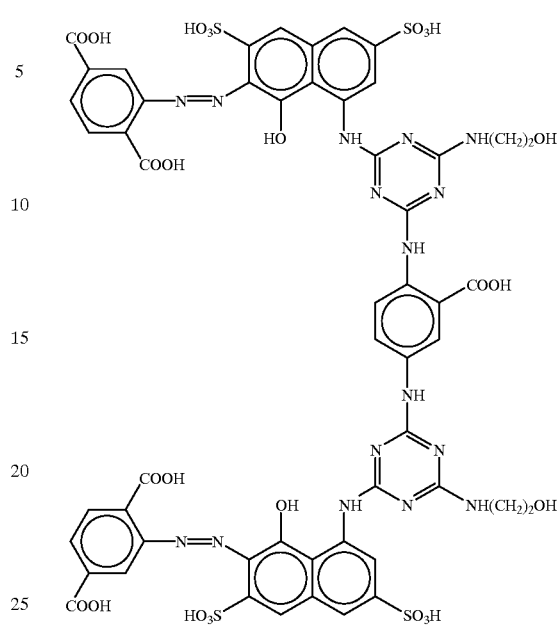
Compound(V-14)
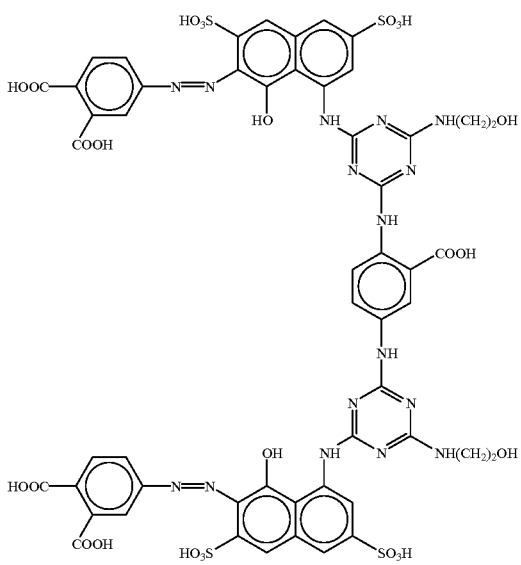
Compound(V-16)
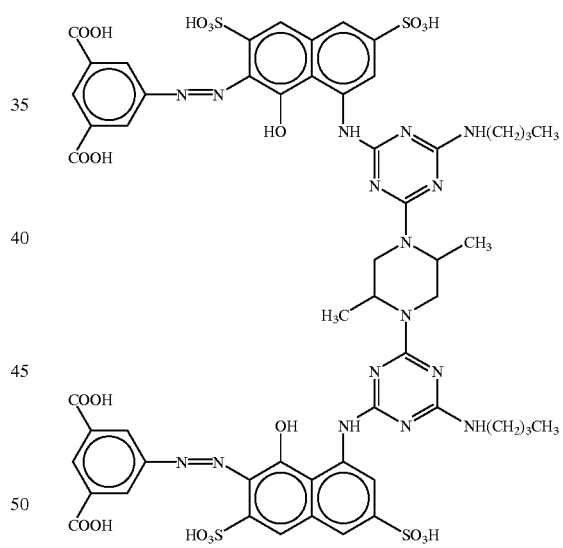

Compound(V-17)
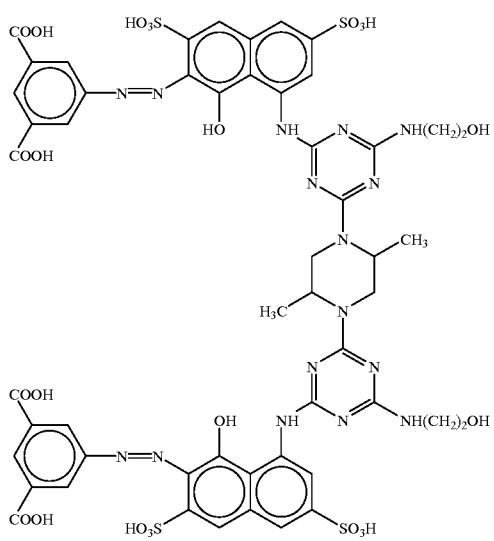
Compound(V-18)
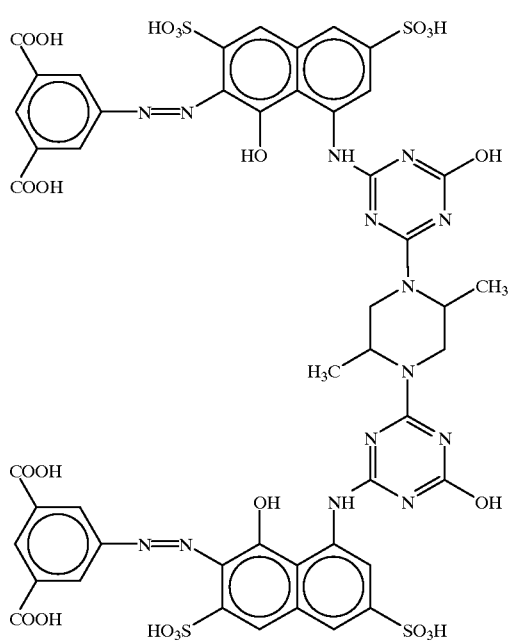
Compound(V-19)
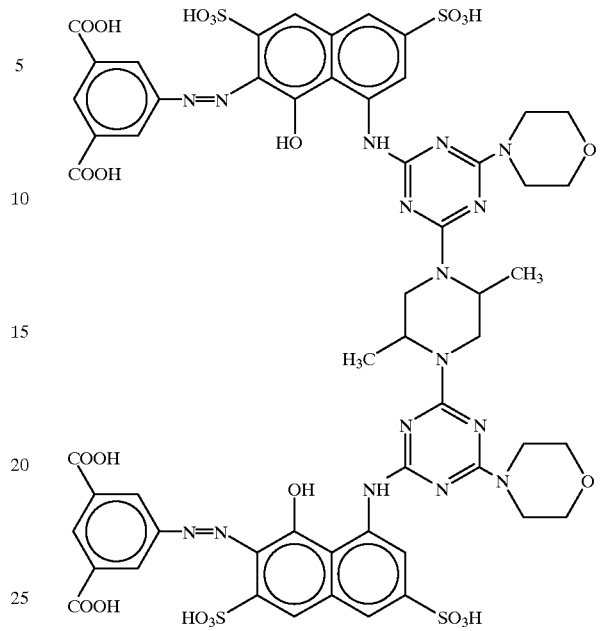
Compound(V-20)
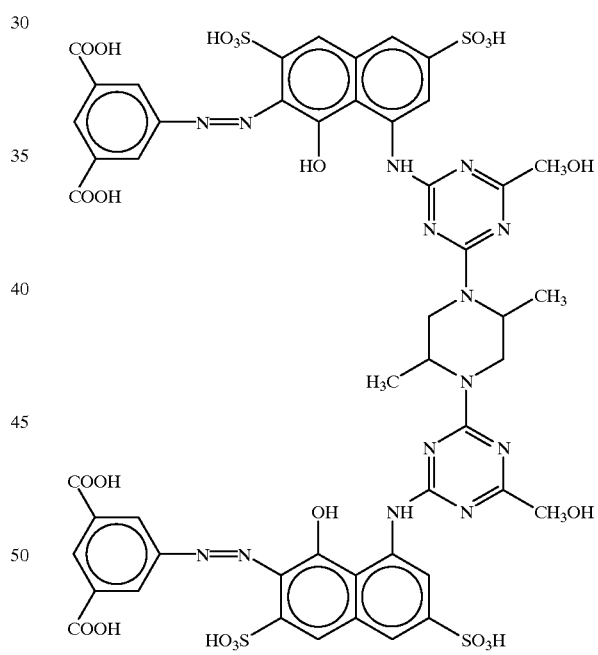

Compound(V-21)
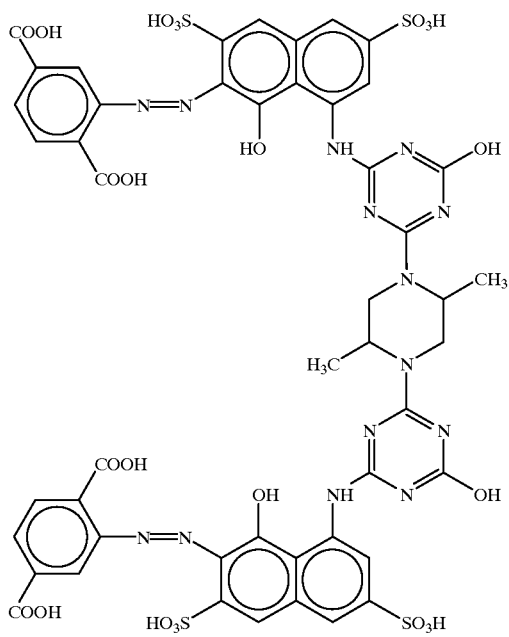
Compound(VI-1)
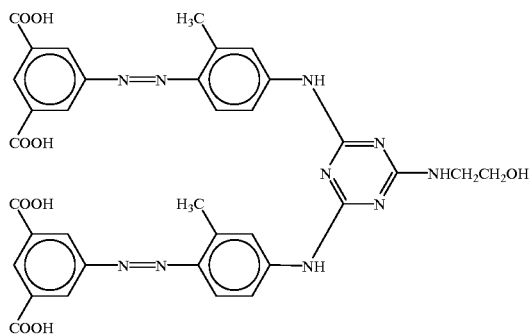
Compound(VI-2)
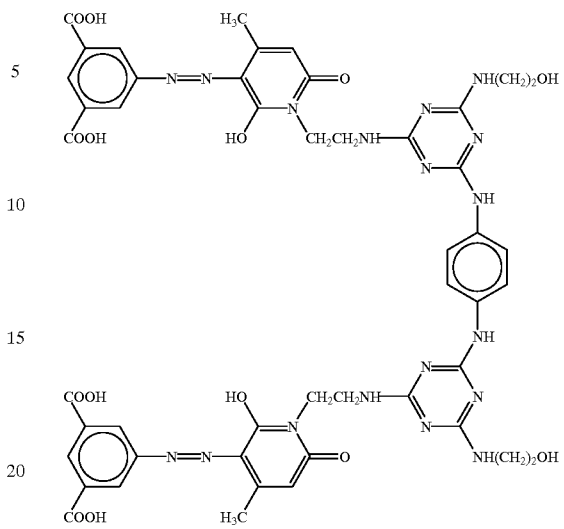
Compound(VI-3)
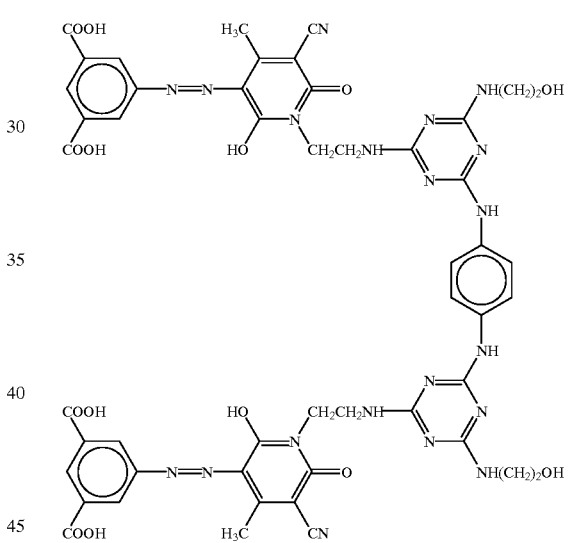

Compound(VI-4)
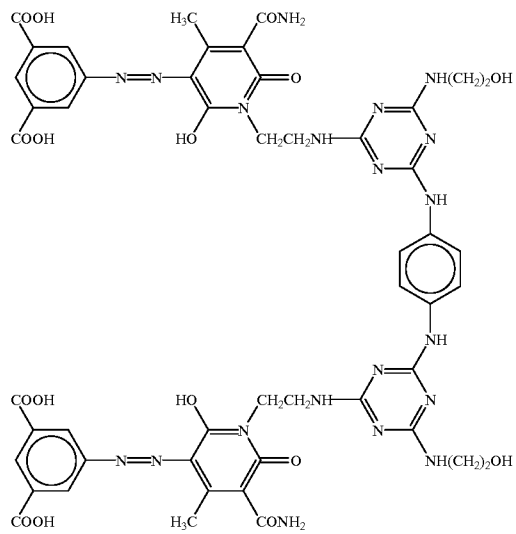
Compound(VI-5)
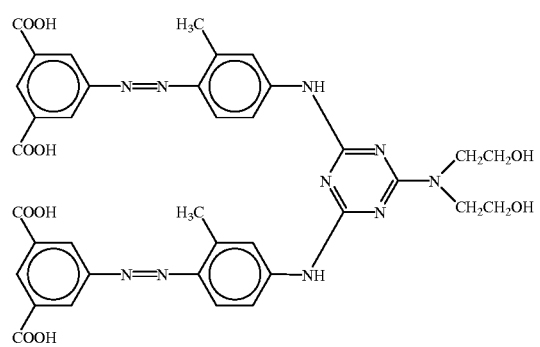
Compound(VI-6)
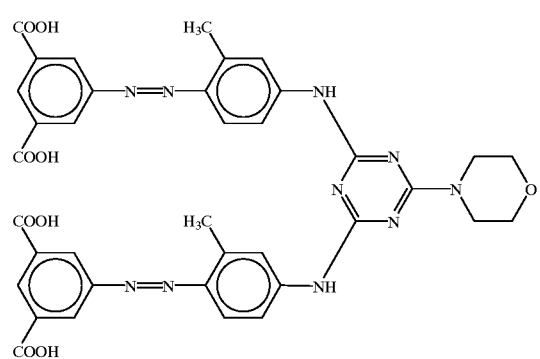
Compound(VI-7)
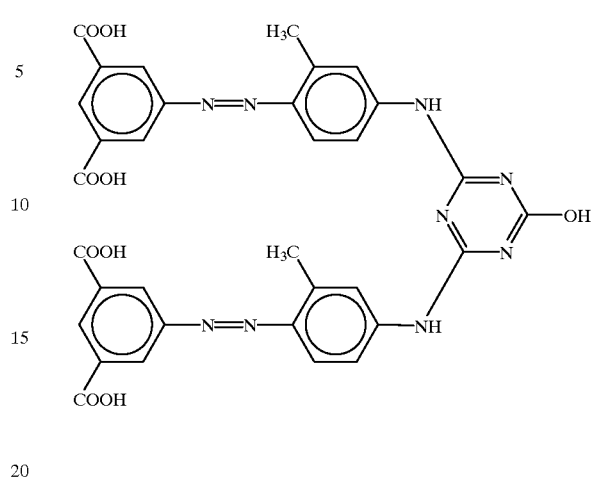
Compound(VI-8)
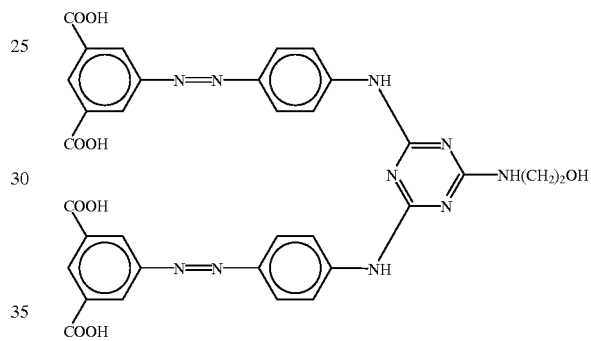
Compound(VI-9)
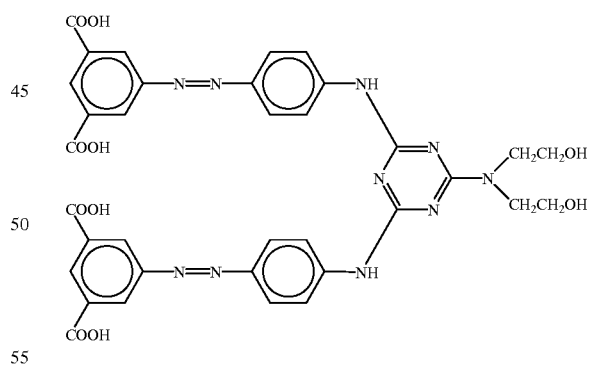

Compound(VI-10)
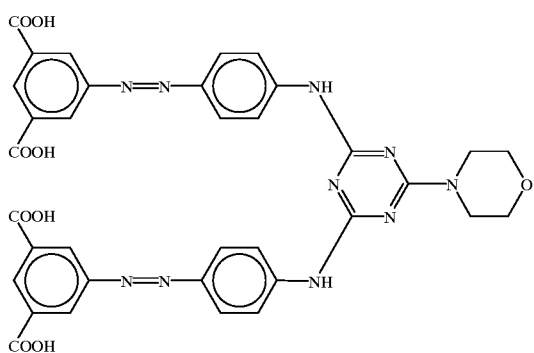
Compound(VI-11)
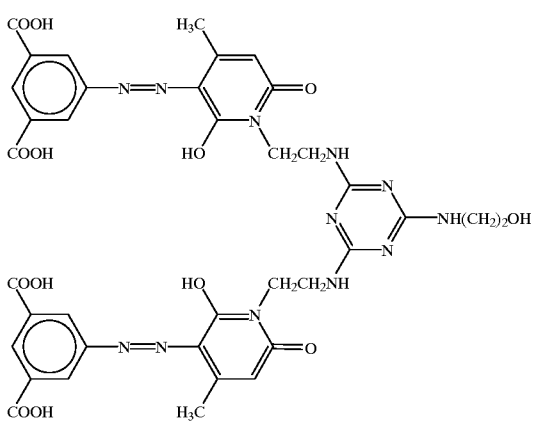
Compound(VI-12)
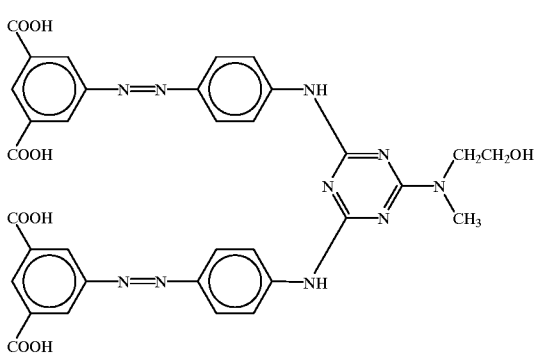
Compound(VI-13)
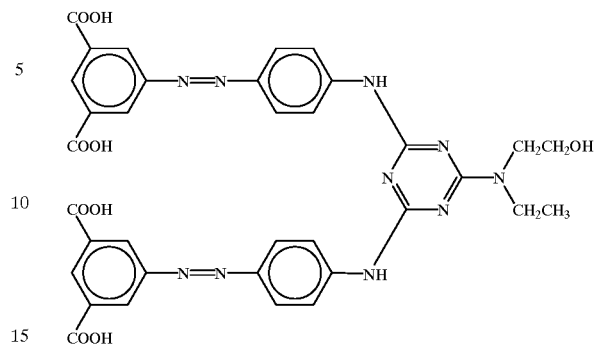
Compound(VI-14)
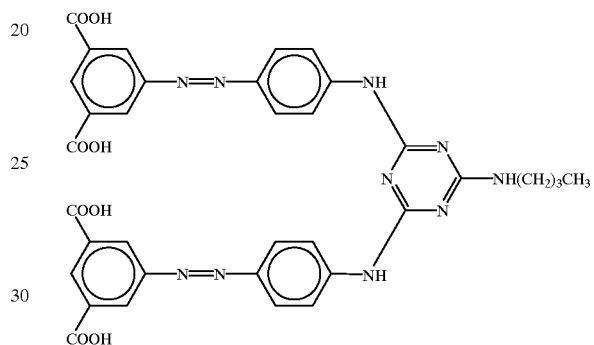
Compound(VI-15)
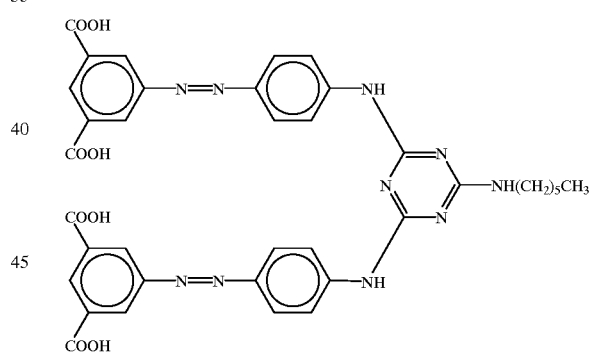
Compound(VI-16)
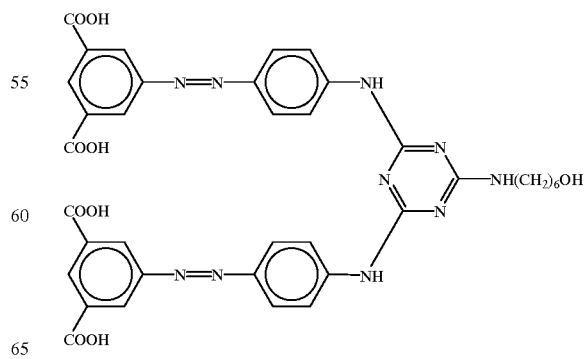

Compound(VI-17)
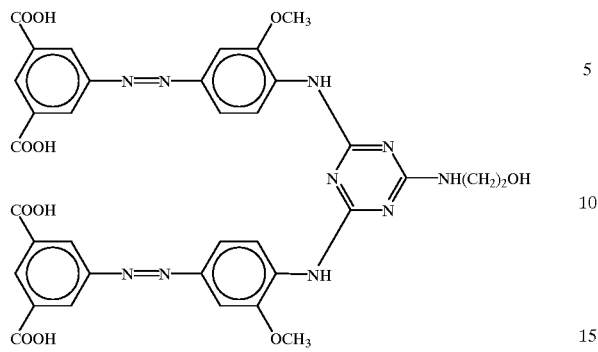
Compound(VI-18)
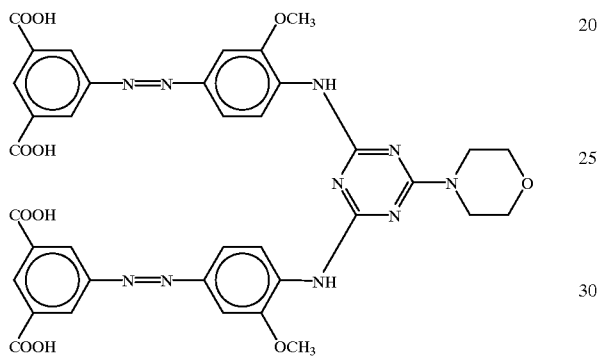
Compound(VI-19)
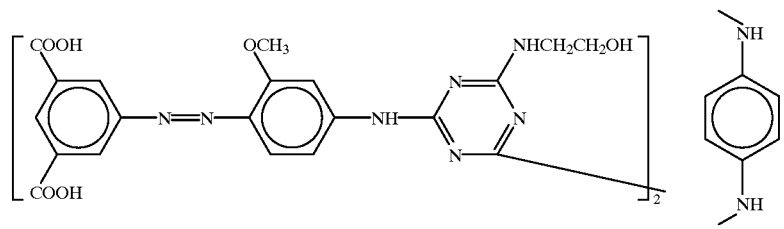
Compound(VI-20)
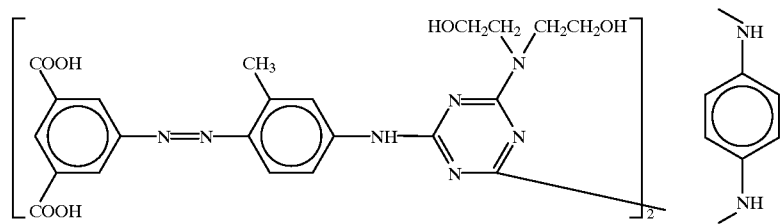

Compound(VI-21)
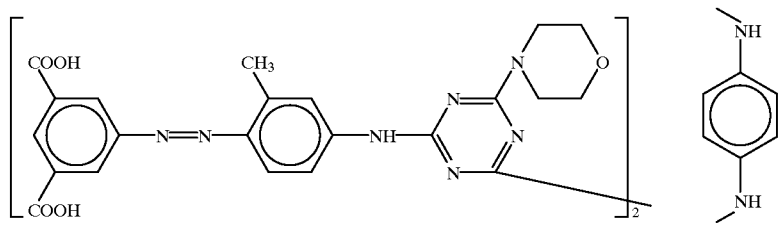
Compound(VI-22)
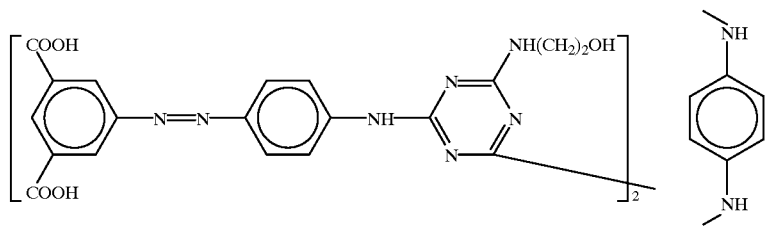
Compound(VI-23)
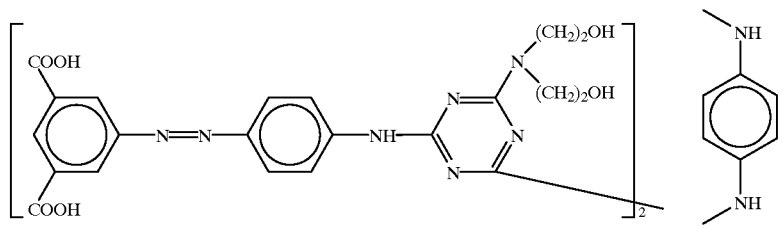
Compound(VI-24)
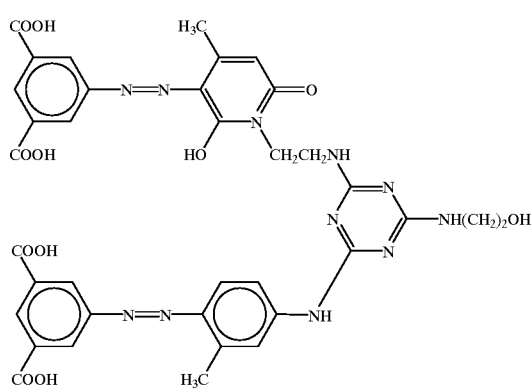
Compound(VI-25)
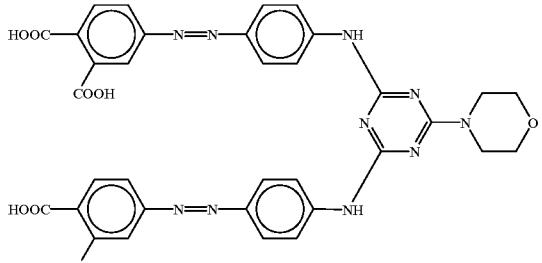

Compound(VI-26)
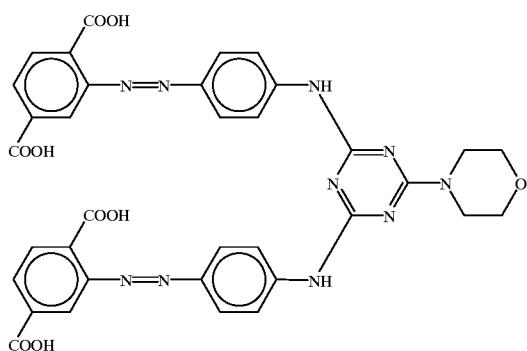
Compound(VI-29)
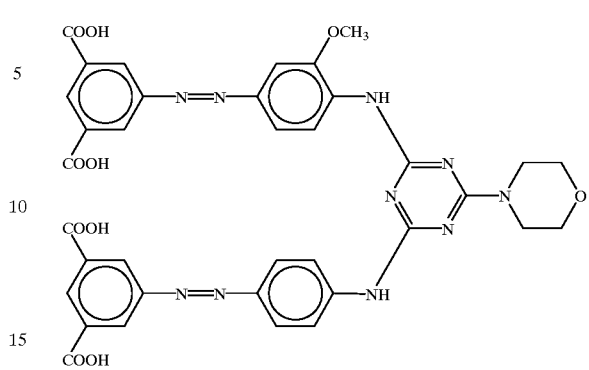
Compound(VI-27)
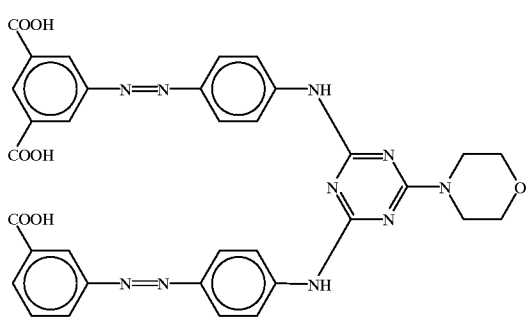
Compound(VI-30)
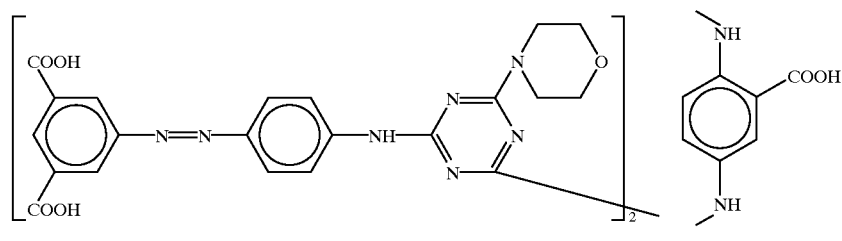
Compound(VI-28)
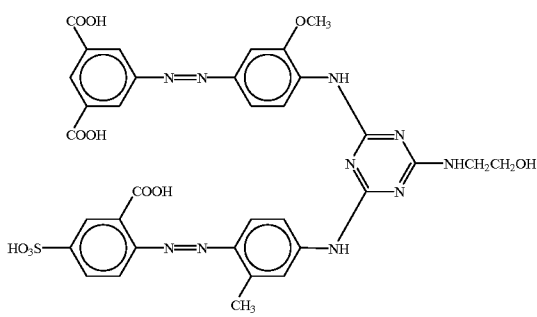
Compound(VII-1)
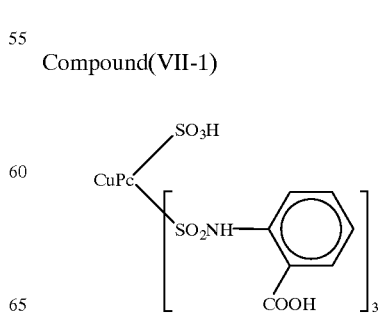

Compound(VII-2)
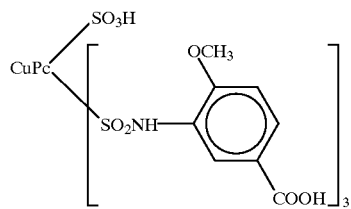
Compound(VII-3)
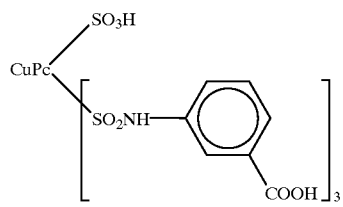
Compound(VII-4)
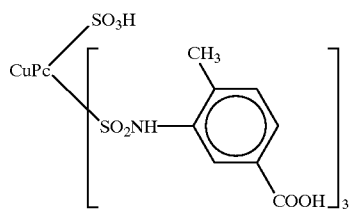
Compound(VII-5)
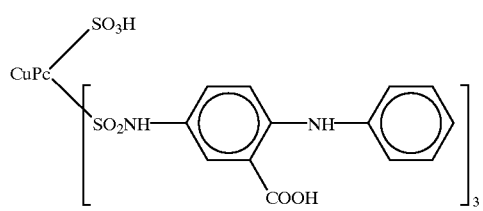
Compound(VII-6)
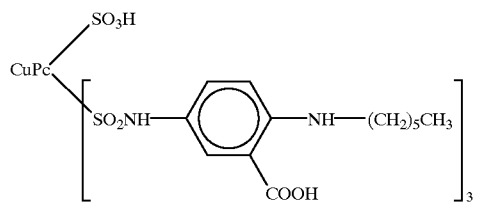
Compound(VII-7)
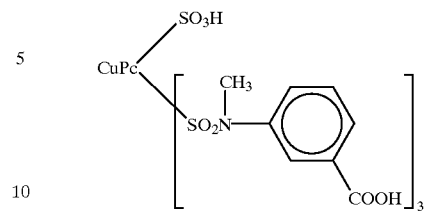
Compound(VII-8)
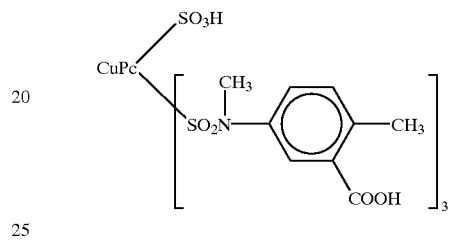
Compound(VII-9)
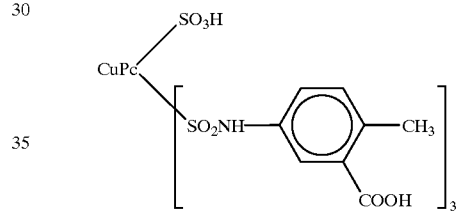
Compound(VII-10)
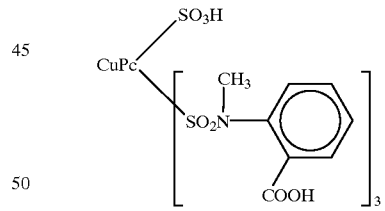
Compound(VII-11)
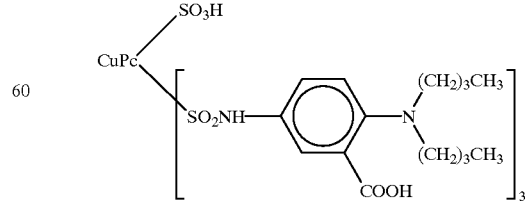

Compound(VIII-1)

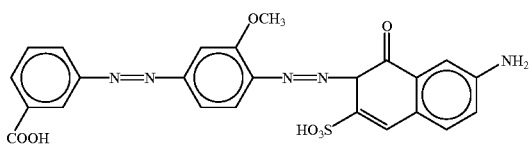

Compound(VIII-2)

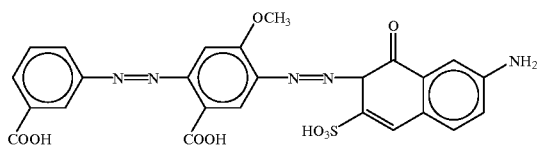

Compound(VIII-3)

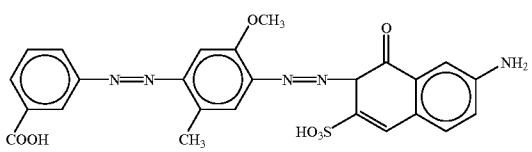

Compound(VIII-4)

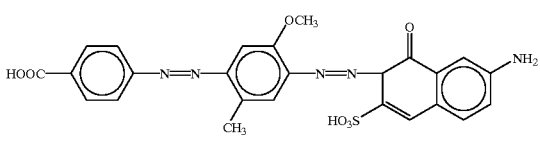

Compound(VIII-5)

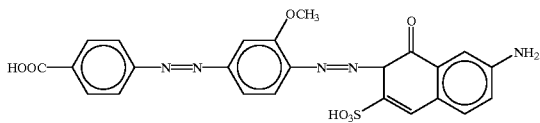

Compound(VIII-6)

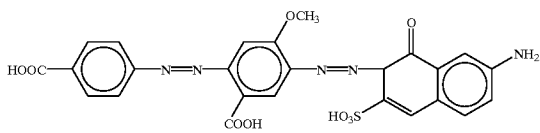

Though these dyes can be used alone, two or more of them may be mixed, and they may be custom colored red, blue, green, and the like in addition to the four primary colors: cyan, magenta, yellow, and black.

Also, an ink jet recording ink of the present invention can contain a dye having no carboxyl group in the form of a free acid.

The content of these dye is determined in accordance with color developing ability of the dye, and is preferably from 0.3 to 10% by weight based on the total amount of the ink. When the content of the dye is less than 0.3% by weight, image concentration is low, and when the content of the dye exceeds 10% by weight, the dye precipitates. It is more preferable that the content of the dye be 1 to 8% by weight from the viewpoint of solubility stability.

The water-soluble organic solvent used in the present invention includes, but is not limited to, polyhydric alcohols and polyglycols such as ethylene glycol, diethylene glycol, triethylene glycol, polyethylene glycol, propylene glycol, 1,5-pentanediol, glycerin, thiodiglycol and the like; glycol ethers such as ethylene glycol monomethyl ether, ethylene glycol monobutyl ether, diethylene glycol monoethyl ether, diethylene glycol monobutyl ether, triethylene glycol monobutyl ether, propylene glycol monomethyl ether and the like; pyrrolidone, N-methyl-2-pyrrolidone, triethanolamine, dimethylsulfoxide, sulfolane, and the like; and alcohols such as ethanol, isopropanol, butanol, benzylalcohol and the like; and alkanolamines such as monoethanolamine, diethanolamine, triethanilamine, and the like.

As the preferred water-soluble organic solvent, polyhydric alcohols and polyglycols are preferable from the viewpoint of moisture retention and the solubility of dye and glycerine, ethylene glycol, diethylene glycol, propylene glycol, and thiodiglycol are particularly preferable. Alternatively, polyglycol ethers are preferable from the viewpoint of permeability of an ink into paper and the solubility of dye, and diethylene glycol monoethyl ether, diethylene glycol monobutyl ether, and triethylene glycol monobutyl ether are particularly preferable.

Though these water-soluble organic solvents can be used alone, two or more may be combined for use.

The ratio added of these water-soluble organic solvents is preferably from 3 to 40% by weight based on the total amount of ink. When the ratio added of the water-soluble organic solvent is less than 3% by weight, the ink dries easily, when the ratio of the water-soluble organic solvent added exceeds 40% by weight, fixing ability of the ink on paper is poor and viscosity increases making discharge poor.

As water used in the present invention, ion-exchanged water, ultrapure water, distilled water, and ultrafiltered water are preferably used to prevent the mixing in of impurities.

The substituted aromatic compound represented by general formula (I) is added to ink of the present invention.

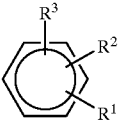

(I)

wherein, $R^1$ is a functional group selected from a carboxyl group, a sulfonic group, a salt of a carboxyl group, and a salt of a sulfonic group, $R^2$ is a functional group selected from hydrogen, a hydroxyl group, an amino group, a nitro group, a methyl group, an ethyl group, a carboxyl group, a sulfonic group, a salt of a carboxyl group, and a salt of a sulfonic group, and $R^3$ is hydrogen, a hydroxyl group, an amino group, a nitro group, a methyl group, and an ethyl group.

Specific examples include, but are not limited to, benzoic acid, salicylic acid, 2-aminobenzoic acid, 3-aminobenzoic acid, 4-aminobenzoic acid, 4-methylbenzoic acid, 3-hydroxybenzoic acid, 4-hydroxybenzoic acid, 4-nitrobenzoic acid, 3,5-diaminobenzoic acid, 3,5-dimethylbenzoic acid, 4-amino-2-hydroxybenzoic acid, benzenesulfonic acid, p-toluenesulfonic acid, p-phenolsulfonic acid, phthalic acid, isophthalic acid, terephthalic acid, 5-aminoisophthalic acid, 5-methylisophthalic acid, 1,2-benzenedisulfonic acid, 1,3-benzenedisulfonic acid, sulfosalicylic acid, and the like.

A substituted aromatic compound is preferred containing two of a carboxyl group, a sulfonic group, a salt of a carboxyl group, and a salt of a sulfonic group, from the viewpoint of solubility in water.

Further, a compound having a hydroxyl group in a substituent is preferred from the viewpoint of stabilization of ink pH.

Examples of particularly preferable substituted aromatic compounds include salicylic acid, 3-hydroxybenzoic acid, 4-hydroxybenzoic acid, p-phenolsulfonic acid, phthalic acid, isopthalic acid, terephthalic acid, 5-aminoisophthalic acid, 5-hydroxyisophthalic acid, 1,2-benzenedisulfonic acid, 1,3-benzenedisulfonic acid and sulfosalicylic acid.

The addition ratio of the substituted aromatic compound is preferably not less than 0.01% by weight from the viewpoint of the effect of mutual action with a dye, and preferably not more than 8% by weight from the viewpoint of solubility of the material itself. More preferably, it is from 0.1 to 3% by weight.

Examples of the alkali metal hydroxide used in the present invention include, but are not limited to, lithium hydroxide, sodiumhydroxide, potassiumhydroxide, and the like.

As the alkali metal hydroxide, lithium hydroxide and sodium hydroxide are preferable because of good water retention when ionized.

The ratio of the alkali metal hydroxide added is determined in accordance with the ratio added of the substituted aromatic compound, and preferably 0.02% or more by weight to maintain a pH of 8 or more, and preferably 5% or less by weight to sufficiently restrain degradation such as corrosion, dissolution, releasing, and the like of material constantly in contact with ink in ink jet recording apparatus including a head material. The alkali metal hydroxide is preferably added in this range so that the pH of ink is from 8 to 12.

When the pH of ink exceeds 12, degradation such as corrosion, dissolution, releasing, and the like of the material which is constantly in contact with ink in an ink jet recording apparatus, including a head material, develops easily, and when the pH of ink is less than 8, a dye precipitates easily from the initial stage. The ink more preferably has a pH of from 8 to 10.

The ink of the present invention may contain an amine compound represented by the following general formula (II):

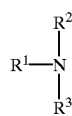

(II)

wherein, one or two of $R^1$, $R^2$, and $R^3$ is an alkyl group having 1 to 5 carbon atoms in the alkyl chain substituted by a substituent selected from a carboxyl group, a sulfonic group, an alkali metal salt of a carboxyl group, and an alkali metal salt of a sulfonic group; and the remainder is a group selected from a hydrogen atom, an alkyl group having 1 to 5 carbon atoms, and a substituted alkyl group having 1 to 5 carbon atoms in the alkyl chain and substituted by a hydroxyl group or carbamoyl group. Two of $R^1$, R2, and $R^3$ may be the same substituent.

In the above-described formula, examples of the alkyl group substituted by a carboxyl group include a carboxymethyl group, 1-carboxyethyl group, 2-carboxyethyl group, 1-carboxy-n-propyl group, 2-carboxy-n-propyl group, 3-carboxypropyl group, 2-carboxy-isopropyl group, 1-carboxy-n-butyl group, 4-carboxybutyl group, 3-carboxy-isobutyl group, 2-methyl-4-carboxybutyl group, carboxy-t-butyl group, 5-carboxypentyl group, and the like. Further, examples of the alkyl group substituted by a sulfonic group include alkyl groups in which the carboxyl group of the above-described carboxyl-substituted alkyl group is substituted by a sulfonic group, and the like. An alkyl group can have a substituent which is in the form of a lithium, sodium, potassium, or ammonium salt of these acidic groups. A carboxymethyl group, 1-carboxyethyl group, 1-carboxy-n-propyl group, sulfomethyl group, 1-sulfoethyl group, and 1-sulfo-n-propyl group are more preferable.

Examples of the alkyl group having 1 to 5 carbon atoms include a methyl group, ethyl group, propyl group, isopropyl group, butyl group, isobutyl group, t-butyl group, pentyl group, isopentyl group, t-pentyl group, neopentyl group, and the like.

Examples of the alkyl group substituted by a hydroxyl group include a methylol group, 2-hydroxyethyl group, methylolmethyl group, trimethylolmethyl group, 1-hydroxy-n-propyl group, 2-hydroxy-n-propyl group, 3-hydroxypropyl group, 2-hydroxy-isopropyl group, 1-hydroxy-n-butyl group, 2-hydroxy-n-butyl group, 4-hydroxylbutyl group, 3-hydroxy-isobutyl group, 2-methyl-3-hydroxybutyl group, hydroxy-t-butyl group, 4-hydroxy-n-pentyl group, 5-hydroxypentyl group, and the like. Examples of the alkyl group substituted by a carbamoyl group include alkyl groups in which the carboxyl group of the above-described carboxyl-substituted alkyl group is substituted by a carbamoyl group. A methylol group, 2-hydroxyethyl group, trimethylolmethyl group, and carbamoylmethyl group are more preferable.

Representative examples of the amine compound include, but are not limited to, the above-described salts of glycine, acetamideglycine, N-2-hydroxyethylglycine, N-carbamoylmethyl-β-alanine, N-2-hydroxyethyl-N-carbamoylmethylglycine, N-hydroxymetyl-N-carbamoylmethyl-γ-amino butyric acid, N-carboxymethyliminodiacetamide, N-carbamoylmethylimino diacetic acid, N-hydroxypropylimino dipropionic acid, N,N-bis (2-hydroxyethyl)glycine, and the like; and aminoethane-sulfonic acid, N-2-hydroxyethyl-2-aminoethane sulfonic acid, N-3-hydroxypropyl-2-aminoethane sulfonic acid, N-carbamoylmethyl-2-aminoethane sulfonic acid, N,N-bis (2-hydroxyethyl)-2-aminoethane sulfonic acid, N-2-hydroxyethyl-N-carbamoylmethylaminomethane sulfonic acid, N-2-hydroxyethyl-N-carbamoylmethyl-2-aminoethane sulfonic acid, N,N-bis-carbamoylmethyl-2-aminoethane sulfonic acid, N-2-hydroxyethyliminodiethane sulfonic acid, N-tris (hydroxymethyl)methyl-3-aminopropane sulfonic acid, and the like.

Among the above-described amine compounds, N,N-bis (2-hydroxyethyl)-2-aminoethane sulfonic acid, acetamideglycine, N-carbamoylmethylimino diacetic acid, N-tris (hydroxymethyl)methyl-3-aminopropane sulfonic acid, and N,N-bis (2-hydroxyethyl)glycine are preferable from the viewpoint of solubility in an ink vehicle, and N,N-bis (2-hydroxyethyl)-2-aminoethane sulfonic acid is more preferable from the viewpoint of thermal stability.

These amine compounds may be used alone or in combination.

The ratio added of the amine compound is regulated to a suitable amount depending on the solubility of the dye itself, and preferably from 0.1 to 8% by weight. When the ratio added of the amine compound is less than 0.1% by weight, solubility stability of the dye is easily lost, and the pH of the solution is unstable. On the other hand, when the ratio added of the amine compound exceeds 8% by weight, the amine compound tends to precipitate. The ratio added of the amine compound is more preferably from 0.4 to 3% by weight due to good balance between the stabilization of solubility stability of the dye and the stabilization of solubility of the amine compound.

In the present invention, an ink may contain a water-soluble organic compound which is solid at normal temperature but 50% or more by weight thereof evaporates at 100 to 350° C. Examples of such an aqueous organic compound include an organic acid ester, organic acid amide, organic acid ammonium salt, thioester, thioamide, carbonic acid ester, carbonic acid amide, phosphoric acid ester, phosphoric acid amide, amino acid, betaine and the like which have a molecular weight of less than 200. The above-described normal temperature means a temperature around 25° C. The phrase "50% or more by weight thereof evaporates at 100 to 350° C." means that when thermogravimetric analysis is conducted and temperature increases at a speed of 20° C./minute, the weight reduction ratio represented by the weight of solid at from 100 to 350° C. over that at normal temperature is 50% or more. In the present invention, the vaporization ratio of these compounds must be 50% or more by weight. When the ratio of vaporization of these compounds is high, the image-improvement effect is high, and, when the ink jet recording method which forms ink droplets by heating the ink is used, kogation is reduced. Therefore, it is preferable that the ratio be 65% or more by weight. In addition, when safety is taken into consideration, urea, thiourea, and derivatives thereof are particularly preferable as the aqueous organic compound.

Examples of the derivatives of urea and thiourea include, but are not limited to, monoalkyl ureas such as methyl urea, ethyl urea, and the like; dialkyl ureas such as dimethyl urea, diethyl urea, and the like; ethylene urea; monoalkylthio ureas such as methylthiourea, ethylthiourea, and the like; dialkylthioureas such as dimethylthio urea, diethylthio urea, and the like; and ethylenethio urea and the like.

From the viewpoint of the moisture retention of an ink, urea and thiourea are preferred, and from the viewpoint of stability over time and solubility stability, ethylene urea is preferred.

The ratio added of the aqueous organic compound is preferably 1% or more by weight to sufficiently retain moisture retention and the mutual action of an amine compound and alkaline metal hydroxide and to obtain an image having no blotting, and is preferably 15% or less by weight to obtain sufficient solubility stability of the aqueous organic compound and sufficient clogging resistance. Further, the ratio from 3 to 9% by weight is more preferable.

An ink of the present invention may contain a surfactant to further stabilize the condition of the dye solution. As the surfactant, any of nonionic, anionic, cationic, and ampholytic surfactants may be used.

Examples of the nonionic surfactant include polyoxyethylenealkylphenyl ethers such as polyoxyethylenenonylphenyl ether, polyoxyethyleneoctylphenyl ether, polyoxyethylenedodecylphenyl ether, and the like; and polyoxyethylenealkyl ether, polyoxyethylene fatty ester, sorbitan fatty ester, polyoxyethylene-polyoxypropylene block copolymer, ethylene oxide adducts of acetylene glycol, ethylene oxide adduct of glycerin, polyoxyethylenesorbitan fatty ester, fatty alkylolamide, and the like. Examples of the anionic surfactant include alkylbenzene sulfonate salt, alkylnaphthalene sulfonate salt, formalin condensate of alkylnaphthalene sulfonate salt, higher fatty acid salt, sulfate salt of higher fatty acid ester, sulfonate salt of higher fatty acid ester, sulfate ester salt and sulfonate salt of higher alcohol ether, alkylcarbonate salt of higher alkyl sulfonamine, sulfosuccinate salt, ester salt thereof, and the like. Examples of the cationic surfactant include primary, secondary and tertiary amine salts, quaternary ammonium salt and the like, and examples of the ampholytic surfactant include betaine, sulfobetaine, sulfatebetaine, imidazolylbetaine, and the like.

Further, fluorine-contained surfactants such as polyoxyethyleneperfluoroaklyl ether, perfluoroaklylbenzene sulfonate salt, perfluoroalkyl quaternary ammonium salt, and silicon-contained surfactants may be added to an ink of the present invention.

Among these surfactants, nonionic surfactants which do not easily cause mutual action with a dye ion and additive ion are preferred, and polyoxyethylenealkyl ether, polyoxyethylenealkylphenyl ether, and polyoxyethylene/polyoxypropylene block copolymer, are preferred from the viewpoint of thermal stability and purity.

The ratio added of the surfactant is preferably not less than 0.002% by weight to stabilize the condition of dissolved dye, and preferably not more than 3% by weight from the view point of thickening and foaming of an ink. More preferably, it is from 0.01 to 1% by weight.

In addition, as an inclusion compound, cyclodextrin, polycyclodextrin, macrocyclic amines, crown ethers, acetamide, and the like, and, as a chelating agent, EDTA (ethylenediamine-N,N,N', N'-tetraacetic acid), EDMA (ethylenediamine-N-monoacetic acid), NTA (nitrilotriacetic acid), and the like may be added to an ink of the present invention.

Also, an ink of the present invention can comprise anti-fungal agents such as dehydroacetic acid, sodium dehydro acetate, propionic acid, sodium propionate and the like, and water-soluble polymers such as sodium alginate, styrene-acrylic acid copolymer, polyvinyl alcohol, polyvinyl pyrrolidone, and the like.

The above-described inks can be used in the ink jet recording method in which an image is recorded by discharging ink droplets from an orifice based on recording signals. As an ink jet recording method, a so-called charge-control method in which ink is discharged using electrostatic-attraction force, a so-called drop-on-demand method (pressure pulse method) in which ink is discharged using the vibration pressure of a piezoelectric element, and a so-called thermal ink jet method in which ink is discharged using the pressure generated by forming and developing bubbles by heating ink, and the like.

When a thermal ink jet method is used, ink drops can be formed by applying a plurality of pulses to a heating means such as a heat generating body for heating an ink.

Particularly, by adding a process in which predischarging is conducted without conducting recording, kogation of a heating head can be suppressed, and excellent images can be obtained over a long period of time.

EXAMPLES

The following examples and comparative examples further illustrate the present invention in detail:

Example 1 ammonium salt of compound (III-1) dye 2.5 parts by weight
glycerin 10 parts by weight
isophthalic acid 0.5 parts by weight
sodium hydroxide 0.3 parts by weight
urea (vaporization rate: 70% by weight) 4 parts by weight
polyoxyethylenenonylphenyl ether (20 mol EO adduct) 0.1 part by weight ion-exchanged water 82.6 parts by weight (Total: 100 parts by weight)

The above-described components were mixed sufficiently, then filtered under pressure using a 0.45 μm filter to prepare an ink. The prepared ink had a pH of 8.5.

Example 2 ammonium salt of compound (III-2) dye 3.0 parts by weight
diethylene glycol 15 parts by weight
4-hydroxybenzoic acid 1.5 parts by weight
sodium hydroxide 0.5 parts by weight
polyoxyethylenelauryl ether (15 mol EO adduct) 0.1 part by weight
ion-exchanged water 79.9 parts by weight (Total: 100 parts by weight)

The above-described components were mixed sufficiently, then filtered under pressure using a 0.45 μm filter to prepare an ink. The prepared ink had a pH of 9.6.

Example 3 ammonium salt of compound (IV-3) dye 4.0 parts by weight
diethylene glycol 15 parts by weight
sodium salicylate 1 parts by weight
sodium hydroxide 0.75 parts by weight
$(HOC_2H_4)_2NC_2H_4SO_3H$ 2.5 parts by weight
Surfinol 465 (manufactured by Nisshin Kagaku K.K.) 0.1 part by weight
ion-exchanged water 76.65 parts by weight (Total: 100 parts by weight)

The above-described components were mixed sufficiently, then filtered under pressure using a 0.45 μm filter to prepare an ink. The prepared ink had a pH of 9.2.

Example 4 ammonium salt of compound (V-16) dye 2.5 parts by weight
diethylene glycol 15 parts by weight
diethylene glycol monobutyl ether 9 parts by weight
sodium benzoate 0.9 parts by weight
sodium hydroxide 0.5 parts by weight
$(HOC_2H_4)_2NC_2H_4SO_3H$ 1.8 parts by weight
thiourea (vaporization rate: 75% by weight) 3 parts by weight
polyoxyethylenelauryl ether (15 mol EO adduct) 0.1 part by weight
ion-exchanged water 67.2 parts by weight (Total: 100 parts by weight)

The above-described components were mixed sufficiently, then filtered under pressure using a 0.45 μm filter to prepare an ink. The prepared ink had a pH of 9.3.

Example 5 ammonium salt of compound (VI-1) dye 2 parts by weight
glycerin 10 parts by weight
thiodiglycol 5 parts by weight
5-aminoisophthalic acid 1.0 part by weight
sodium hydroxide 0.9 parts by weight
Pluronic PE4300 (manufactured by BASF) 0.2 part by weight
ion-exchanged water 80.9 parts by weight (Total: 100 parts by weight)

The above-described components were mixed sufficiently, then filtered under pressure using a 0.45 μm filter to prepare an ink. The prepared ink had a pH of 9.9.

Example 6 ammonium salt of compound (VII-1) dye 3.5 parts by weight
diethylene glycol 15 parts by weight
diethylene glycol monobutyl ether 9 parts by weight
sodium benzoate 0.3 parts by weight
sodium hydroxide 0.25 part by weight
$(HOC_2H_4)_2NCH_2COOH$ 1.5 parts by weight
urea (vaporization rate: 70% by weight) 5 parts by weight
Pluronic PE4300 (manufactured by BASF) 0.2 part by weight
ion-exchanged water 65.25 parts by weight (Total: 100 parts by weight)

The above-described components were mixed sufficiently, then filtered under pressure using a 0.45 μm filter to prepare an ink. The prepared ink had a pH of 9.4.

Example 7 ammonium salt of compound (III-1) dye 3 parts by weight
glycerin 15 parts by weight
isopropyl alcohol 4 parts by weight
5-aminoisophthalic acid 0.5 parts by weight
sodium hydroxide 1.0 parts by weight
ethyleneurea (vaporization rate: 98% by weight) 3 parts by weight
ion-exchanged water 73.5 parts by weight (Total: 100 parts by weight)

The above-described components were mixed sufficiently, then filtered under pressure using a 0.45 μm filter to prepare an ink. The prepared ink had a pH of 11.2.

Example 8 ammonium salt of compound (VIII-1) dye 3 parts by weight
glycerin 5 parts by weight
propylene glycol 6 parts by weight
p-phenolsulfonic acid 0.5 parts by weight
sodium hydroxide 0.5 parts by weight
polyoxyethylenenonyl ether (18 mol EO adduct) 0.1 parts by weight
ion-exchanged water 84.9 parts by weight (Total: 100 parts by weight)

The above-described components were mixed sufficiently, then filtered under pressure using a 0.45 μm filter to prepare an ink. The prepared ink had a pH of 10.3.

Example 9 ammonium salt of compound (V-4) dye 2 parts by weight
diethylene glycol 18 parts by weight
triethylene glycol monobutyl ether 6 parts by weight
5-hydroxyisophthalic acid 2.5 parts by weight
sodium hydroxide 1.4 parts by weight
ion-exchanged water 70.1 parts by weight (Total: 100 parts by weight)

The above-described components were mixed sufficiently, then filtered under pressure using a 0.45 um filter to prepare an ink. The prepared ink had a pH of 9.6.

Example 10 ammonium salt of compound (VII-3) dye 3.5 parts by weight
glycerin 8 parts by weight
ethylene glycol 7 parts by weight
sulfosalicylic acid 0.8 parts by weight
sodium hydroxide 0.45 parts by weight
$(HOC_2H_4)_2NCH_2COOH$ 1 parts by weight
Surfinol 465 (manufactured by Nisshin Kagaku K.K.) 1 part by weight ion-exchanged water 78.25 parts by weight (Total: 100 parts by weight)

The above-described components were mixed sufficiently, then filtered under pressure using a 0.45 µm filter to prepare an ink. The prepared ink had a pH of 8.9.

Example 11

An ink was prepared in the same manner as in Example 1 except that 0.2 parts by weight of lithium hydroxide was added instead of the sodium hydroxide in Example 1. The prepared ink had a pH of 8.8.

Example 12

An ink was prepared in the same manner as in Example 4 except that 0.3 parts by weight of lithium hydroxide was added instead of the sodium hydroxide in Example 4. The prepared ink had a pH of 9.4.

Example 13

An ink was prepared in the same manner as in Example 6 except that 0.15 parts by weight of lithium hydroxide was added instead of the sodium hydroxide in Example 6. The prepared ink had a pH of 9.4.

Example 14

An ink was prepared in the same manner as in Example 6 except that 1.3 parts by weight of potassium hydroxide was added instead of the sodium hydroxide in Example 5. The prepared ink had a pH of 10.1.

Examples 15 to 17

Inks were prepared in the same manner as in Examples 4, 5, and 6 except that the ammonium salts of dyes of Examples 4, 5 and 6 were substituted by sodium salts. The prepared inks had a pH of 9.6, 10.4, and 9.5, respectively.

Example 18

An ink was prepared in the same manner as in Example 4 except that 0.5 parts by weight of disodium 1,3-benzenedisulfonate was added instead of the sodium benzoate of Example 4. The prepared ink had a pH of 9.1.

Example 19

An ink was prepared in the same manner as in Example 4 except that 0.5 parts by weight of sodium salicylate was added instead of the sodium benzoate of Example 6. The prepared ink had a pH of 9.4.

Comparative Example 1 ammonium salt of compound (III-1) dye 2.5 parts by weight
glycerin 10 parts by weight
sodium hydroxide 0.05 parts by weight
urea (vaporization rate: 70% by weight) 4 parts by weight
polyoxyethylenenonylphenyl ether(20 mol EO adduct) 0.1 part by weight
ion-exchanged water 83.35 parts by weight (Total: 100 parts by weight)

The above-described components were mixed sufficiently, then filtered under pressure using a 0.45 µm filter to prepare an ink. The prepared ink had a pH of 8.8.

Comparative Example 2 ammonium salt of compound (VI-1) dye 2 parts by weight
glycerin 10 parts by weight
thiodiglycol 5 parts by weight
sodium hydroxide 0.25 parts by weight
Pluronic PE4300 (manufactured by BASF) 0.2 part by weight
ion-exchanged water 79.8 parts by weight (Total: 97.25 parts by weight)

The above-described components were mixed sufficiently, then filtered under pressure using a 0.45 µm filter to prepare an ink. The prepared ink had a pH of 10.0.

Comparative Example 3 ammonium salt of compound (VII-1) dye 3.5 parts by weight
diethylene glycol 15 parts by weight
diethylene glycol monobutyl ether 9 parts by weight
sodium hydroxide 0.6 parts by weight
$(HOC_2H_4)_2NCH_2COOH$ 1.5 parts by weight
urea (vaporization rate: 70% by weight) 5 parts by weight
Pluronic PE4300 (manufactured by BASF) 0.2 part by weight
ion-exchanged water 64 parts by weight (Total: 98.8 parts by weight)

The above-described components were mixed sufficiently, then filtered under pressure using a 0.45 µm filter to prepare an ink. The prepared ink had a pH of 10.9.

Comparative Example 4 ammonium salt of compound (V-4) dye 2 parts by weight
diethylene glycol 18 parts by weight
triethylene glycol monobutyl ether 6 parts by weight
sodium hydroxide 0.2 part by weight
ion-exchanged water 70.1 parts by weight (Total: 96.3 parts by weight)

The above-described components were mixed sufficiently, then filtered under pressure using a 0.45 µm filter to prepare an ink. The prepared ink had a pH of 9.7.

Comparative Example 5 ammonium salt of compound (VI-1) dye 2 parts by weight
glycerin 10 parts by weight
thiodiglycol 5 parts by weight
5-aminoisophthalic acid 1 part by weight
25% ammonia water 2 parts by weight
Pluronic PE4300 (manufactured by BASF) 0.2 part by weight
ion-exchanged water 79.8 parts by weight (Total: 100 parts by weight)

The above-described components were mixed sufficiently, then filtered under pressure using a 0.45 µm filter to prepare an ink. The prepared ink had a pH of 9.5.

Comparative Example 6 ammonium salt of compound (VII-1) dye 3.5 parts by weight
diethylene glycol 15 parts by weight
diethylene glycol monobutyl ether 9 parts by weight
sodium benzoate 0.3 parts by weight
25% ammonia water 1.5 parts by weight
$(HOC_2H_4)_2NCH_2COOH$ 1.5 parts by weight
urea (vaporization rate: 70% by weight) 5 parts by weight
Pluronic PE4300 (manufactured by BASF) 0.2 part by weight
ion-exchanged water 64 parts by weight (Total: 100 parts by weight)

The above-described components were mixed sufficiently, then filtered under pressure using a 0.45 µm filter to prepare an ink. The prepared ink had a pH of 9.4.

Comparative Example 7

An ink was prepared in the same manner as in Example 1 except that the dye in Example 1 was changed to Food Black 2. The prepared ink had a pH of 8.2.

Comparative Example 8

An ink was prepared in the same manner as in Example 5 except that the dye in Example 5 was changed to Direct Yellow 86. The prepared ink had a pH of 9.3.

Comparative Example 9

An ink was prepared in the same manner as in Example 9 except that the dye in Example 9 was changed to Acid Red 52. The prepared ink had a pH of 9.2.

Comparative Example 10

An ink was prepared in the same manner as in Example 10 except that the dye in Example 10 was changed to Acid Blue 9. The prepared ink had a pH of 8.5.

Comparative Example 11

An ink was prepared in the same manner as in Example 4 except that the amount added of sodium hydroxide in Example 4 was changed to 5 parts by weight. The prepared ink had a pH of 13.2.

Comparative Example 12

An ink was prepared in the same manner as in Example 1 except that the amound added of sodium hydroxide in Example 1 was changed to 0.1 part by weight. The prepared ink had a pH of 6.5.

The following evaluations were made using the inks of Examples 1 to 19, and Comparative Examples 1 to 12. Results are shown in Tables 2 to 5.

1) pH pH was measured by a pH meter (manufactured by Horiba Ltd.) at 20° C. and 50% RH.

The following evaluations were conducted using a prototyped ink jet printing head (constituent materials are composed of silicon, polyimides, epoxy compounds, and the like) and a thermal ink jet printer equipped with the head. The drive condition of the print head included a driving voltage of 30 V, a resistance of a heat generating resist of 180 Ω and a frequency of 6 kHz, and driving pulse of print discharge according to recording signals and driving pulse of predischarge were conducted under the following conditions: The number of pulse for predischarge was $1 \times 10^5$ when the number of pulse for print discharge reached $1 \times 10^7$.

TABLE 1

| Discharge | pre-pulse (μs) | interval (μs) | main pulse (μs) |
|---|---|---|---|
| print | 0.5 | 1.0 | 4.8 |
| ore | 1.0 | 1.0 | 3.8 |

2) Water resistance

A solid image was printed on FX-L paper (manufactured by Fuji Xerox Co., Ltd.) and Xerox 4024 paper (manufactured by Xerox Co., Ltd.) using the prototype thermal ink jet printer, and the density of the solid image was measured using a Machbeth densitometer. After completion of printing, the print was left as is for 24 hours, then immersed in water for 3 minutes and took out and dried, then, the density was measured again, and the density remaining ratio of the printed image was calculated and used as an index of water resistance.

○ The density remaining ratio is 85% or more.

Δ The density remaining ratio is more than 50 and less than 85%.

X The density remaining ratio is 50% or less.

3) Clogging

The prototype ink jet recording head was left open in an atmosphere of 10° C., 15% RH, and 30° C., 85% RH, for a specific time, then a discharge test was conducted and evaluated according to the following criteria:

○ Dischargeable after being left for 300 seconds

Δ Dischargeable after being left for 180 seconds

X Undischargeable after being left for 180 seconds

4) Discharge recoverability

The prototype ink jet recording head was filled with an ink, left at 10° C., 15% RH, and 30° C., 85% RH, for two months, then a recovery operation was conducted with an absorbing pump, then printing was conducted to evaluate whether normal printing was possible.

○ Normal printing was possible within 3 recovery tries.

Δ Normal printing was possible after 4 to 8 recovery tries.

X Normal printing was not possible after 4 to 8 recovery tries.

5) Image quality 1

English and number characters and a solid image were printed on FX-L paper (manufactured by Fuji Xerox Co., Ltd.) and Xerox 4024 paper (manufactured by Xerox Co., Ltd.) using the prototype thermal ink jet printer, and blotting of the resultant images was evaluated by sight.

Blotting evaluation

○ Negligible blotting, sharp images

Δ Some blotting

X Heavy blotting, illegible

6) Image quality 2

A solid image was printed on FX-L paper (manufactured by Fuji Xerox Co., Ltd.) using the prototype thermal ink jet printer, and voids of the resultant image was evaluated by sight. The evaluations were conducted at a printing frequency of 5 kHz and 7 kHz.

Dropout evaluation in image

○ No voids in solid image, uniform image

Δ Some voids in solid image

X Large voids in solid image

7) Image quality 3

1 dot line was printed on FX-L paper (manufactured by Fuji Xerox Co., Ltd.) using the prototype thermal ink jet printer, and gap of ink adhesion position was evaluated by vision.

Evaluation of gap of ink adhesion position

○ No disorder in 1 dot line, excellent linear feature

Δ Slight disorder in 1 dot line

X Disorder in 1 dot line

8) Continuous droplet test (burnt deposition on heater, heater failure)

Continuous droplet testing was conducted using the prototype ink jet printer, and the ink droplet amount was measured when the number of pulse reached $1 \times 10^8$. Burnt deposition on a heater was evaluated by comparing the initial droplet amount with the following criteria:

○ Variation in droplet amount is less than ±10%, there is no voids and no discontinuity in image.

Δ Variation in droplet amount is from ±10% to less than ±20%, ratio of voids and discontinuity notable in image is less than 5%.

X Unacceptable variation in droplet amount is ±20% or more, ratio of voids and discontinuity in image is 5% or more.

Simultaneously, heater failure (~1×10⁸ pulse) was observed and evaluated as follows:

○ Occurrence

X No occurrence

TABLE 2

| Example | Water resistance L paper | Water resistance 4024 paper | Clogging | Discharge recoverability after being left for a long period of time | image quality (blotting) L paper | image quality (blotting) 4024 paper |
|---|---|---|---|---|---|---|
| 1 | ○ | ○ | ○ | ○ | ○ | ○ |
| 2 | ○ | ○ | ○ | ○ | ○ | ○ |
| 3 | ○ | ○ | ○ | ○ | ○ | ○ |
| 4 | ○ | ○ | ○ | ○ | Δ | Δ |
| 5 | ○ | ○ | ○ | ○ | ○ | ○ |
| 6 | ○ | ○ | ○ | ○ | Δ | Δ |
| 7 | ○ | Δ | ○ | ○ | ○ | ○ |
| 8 | ○ | ○ | ○ | ○ | ○ | ○ |
| 9 | ○ | ○ | ○ | ○ | Δ | Δ |
| 10 | ○ | ○ | ○ | Δ | ○ | ○ |
| 11 | ○ | ○ | ○ | ○ | ○ | ○ |
| 12 | ○ | ○ | ○ | ○ | ○ | ○ |
| 13 | ○ | ○ | ○ | ○ | ○ | ○ |
| 14 | ○ | ○ | ○ | ○ | ○ | ○ |
| 15 | ○ | ○ | ○ | ○ | ○ | ○ |
| 16 | ○ | Δ | ○ | ○ | ○ | ○ |
| 17 | ○ | ○ | ○ | ○ | ○ | ○ |
| 18 | ○ | ○ | ○ | ○ | ○ | ○ |
| 19 | ○ | ○ | ○ | ○ | ○ | ○ |

TABLE 3

| Comparative Example | Water resistance L paper | Water resistance 4024 paper | Clogging | Discharge recoverability after being left for a long period of time | image quality (blotting) L paper | image quality (blotting) 4024 paper |
|---|---|---|---|---|---|---|
| 1 | ○ | ○ | Δ | Δ | ○ | ○ |
| 2 | ○ | ○ | Δ | Δ | ○ | ○ |
| 3 | ○ | ○ | Δ | Δ | Δ | Δ |
| 4 | ○ | ○ | Δ | Δ | Δ | Δ |
| 5 | ○ | ○ | Δ | X | ○ | ○ |
| 6 | ○ | ○ | Δ | X | Δ | Δ |
| 7 | X | X | ○ | ○ | ○ | ○ |
| 8 | X | X | ○ | ○ | ○ | ○ |
| 9 | X | X | ○ | ○ | Δ | Δ |
| 10 | X | X | ○ | ○ | ○ | ○ |
| 11 | Δ | Δ | ○ | ○ | Δ | Δ |
| 12 | ○ | ○ | X | X | ○ | ○ |

TABLE 4

| Example | Image quality (voids) 5 kHz | Image quality (voids) 7 kHz | Image quality (gap of adhesion position) | Continuous discharge test burnt deposition | Continuous discharge test Heater failure |
|---|---|---|---|---|---|
| 1 | ○ | ○ | ○ | ○ | ○ |
| 2 | ○ | ○ | ○ | ○ | ○ |
| 3 | ○ | ○ | ○ | ○ | ○ |
| 4 | ○ | ○ | ○ | ○ | ○ |
| 5 | ○ | ○ | ○ | ○ | ○ |
| 6 | ○ | ○ | ○ | ○ | ○ |
| 7 | ○ | Δ | ○ | ○ | ○ |

TABLE 4-continued

| Example | Image quality (voids) 5 kHz | Image quality (voids) 7 kHz | Image quality (gap of adhesion position) | Continuous discharge test burnt deposition | Continuous discharge test Heater failure |
|---|---|---|---|---|---|
| 8 | ○ | ○ | ○ | ○ | ○ |
| 9 | ○ | ○ | ○ | ○ | ○ |
| 10 | ○ | ○ | ○ | ○ | ○ |
| 11 | ○ | ○ | ○ | ○ | ○ |
| 12 | ○ | ○ | ○ | ○ | ○ |
| 13 | ○ | ○ | ○ | ○ | ○ |
| 14 | ○ | ○ | ○ | ○ | ○ |
| 15 | ○ | ○ | ○ | ○ | ○ |
| 16 | ○ | ○ | ○ | ○ | ○ |
| 17 | ○ | ○ | ○ | ○ | ○ |
| 18 | ○ | ○ | ○ | ○ | ○ |
| 19 | ○ | ○ | ○ | ○ | ○ |

TABLE 5

| Comparative Example | Image quality (voids) 5 kHz | Image quality (voids) 7 kHz | Image quality (gap of adhesion position) | Continuous discharge test Burnt deposition | Continuous discharge test Heater failure |
|---|---|---|---|---|---|
| 1 | X | X | Δ | X | ○ |
| 2 | X | X | Δ | X | ○ |
| 3 | X | X | Δ | X | ○ |
| 4 | X | X | Δ | X | ○ |
| 5 | ○ | X | ○ | Δ | ○ |
| 6 | Δ | X | X | Δ | ○ |
| 7 | ○ | X | ○ | ○ | ○ |
| 8 | ○ | ○ | ○ | ○ | ○ |
| 9 | ○ | ○ | ○ | ○ | ○ |
| 10 | ○ | ○ | ○ | ○ | ○ |
| 11 | ○ | ○ | X | ○ | X |
| 12 | ○ | Δ | X | X | ○ |

It can be seen from the above tables that the inks of the present examples are excellent in water resistance, image quality and nozzle clogging resistance. They have an ample jetting frequency response, can provide stable dischargeability over a long time, are excellent in long storage stability, and provide high reliability.

What is claimed is:

1. An ink jet recording ink comprising water, a water-soluble organic solvent, at least one dye having at least one carboxyl group in the form of a free acid, a substituted aromatic compound represented by general formula (I) and at least one compound selected from alkali metal hydroxides, wherein the pH value thereof is from 8 to 12:

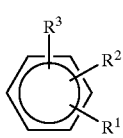

(I)

wherein, $R^1$ is a functional group selected from the group consisting of a carboxyl group, a sulfonic group, a salt of a carboxyl group, and a salt of a sulfonic group, $R^2$ is a functional group selected from the group consisting of hydrogen, a hydroxyl group, an amino group, a nitro group, a methyl group, an ethyl group, a carboxyl group, a sulfonic group, a salt of a carboxyl group, and a salt of a sulfonic group, and $R^3$ is a functional group selected from the group consisting of a hydrogen, a hydroxyl group, an amino group, a nitro group, a methyl group, and an ethyl group.

2. The ink jet recording ink according to claim 1, wherein the content of said substituted aromatic compound is from 0.01 to 8% by weight.

3. The ink jet recording ink according to claim 1, wherein the content of said alkali metal hydroxide is from 0.02 to 5% by weight.

4. The ink jet recording ink according to claim 1, further comprising at least one amine compound represented by the following general formula (II):

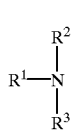

(II)

wherein, one or two of $R^1$, $R^2$, and $R^3$ are an alkyl group having 1 to 5 carbon atoms in the alkyl chain and substituted by a substituent selected from the group consisting of a carboxyl group, a sulfonic group, an alkali metal salt of a carboxyl group, and an alkali metal salt of a sulfonic group; and the remainder is a group selected from the group consisting of a hydrogen atom, an alkyl group having 1 to 5 carbon atoms, and a substituted alkyl group having 1 to 5 carbon atoms in the alkyl chain and a substituted by a hydroxyl group or carbamoyl group.

5. The ink jet recording ink according to claim 4, wherein the content of said amine compound is from 0.1 to 8% by weight.

6. The ink jet recording ink according to claim 1, further comprising a water-soluble organic compound which is solid at normal temperature, and which loses 50% or more of its weight by vaporization at a temperature of from 100 to 350° C.

7. The ink jet recording ink according to claim 6, wherein the content of said water-soluble organic compound is from 1 to 15% by weight.

8. The ink jet recording ink according to claim 6, wherein said water-soluble organic compound is at least one compound selected from the group consisting of urea, thiourea, and derivatives thereof.

9. The ink jet recording ink according to claim 1, which comprises at least one ammonium ion as a counter ion of said dye.

10. The ink jet recording ink according to claim 1, wherein said dye comprises at least one dye represented by following general formulas (III) to (VIII) in the form of a free acid:

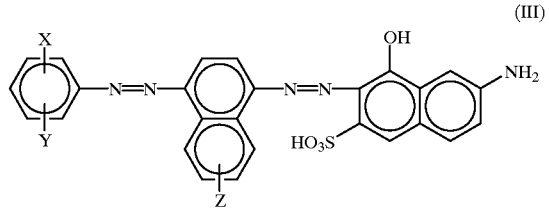

(III)

wherein X and Y are each hydrogen or a carboxyl group; Z is hydrogen, a carboxyl group, or sulfonic group; and general formula (III) has one or more carboxyl groups;

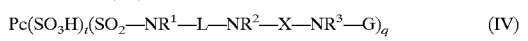

(IV)

wherein Pc is a phthalocyanine nucleus containing metal; $R^1$, $R^2$, and $R^3$ are each independently hydrogen, an alkyl group, substituted alkyl group, alkenyl group, substituted alkenyl group, aralkyl group, or substituted aralkyl group; L is a divalent organic bonding group; X is a carbonyl group or a group represented by formulas (1) to (3), G is a colorless organic group substituted by one or two groups selected from the group consisting of a mercaptocarbonyl group and a carboxyl group; t+q is 3 to 4; q is 1 or more; and general formula (IV) has 1 or more carboxyl groups and 1 or more sulfonic groups; and the sum of the number of the mercaptocarbonyl groups and the number of the carboxyl groups is equal to or greater than the number of the sulfonic groups;

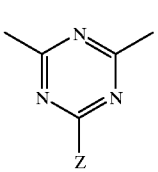

(1)

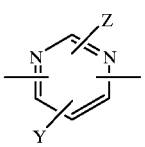

(2)

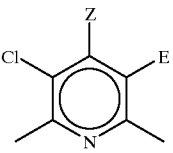

(3)

wherein in formulas (1) to (3), Z is $NR^4R^5$, $SR^6$, or $OR^6$; Y is hydrogen, chlorine, Z, $SR^7$, or $OR^7$; E is chlorine or a cyano group; $R^4$ and $R^5$ are each independently hydrogen, an alkyl group, substituted alkyl group, aryl group, substituted aryl group, aralkyl group, or substituted aralkyl group, or a group constituting a 5- or 6-member ring together with a nitrogen atom; and $R^6$ and $R^7$ are each independently hydrogen, an alkyl group, substituted alkyl group, aryl group, substituted aryl group, aralkyl group, or substituted aralkyl group;

(V)

wherein J is a group represented by formula (1) described below; $Ar^1$ and $Ar^2$ are each independently an aryl group or substituted aryl group; at least one of $Ar^1$ and $Ar^2$ has at least one substituent selected from the group consisting of a mercaptocarbonyl group and a carboxyl group; L is a divalent organic bonding group; X is a carbonyl group or a group represented by formulas (2) to (4) below; and general formula (V) has 1 or more carboxyl groups and 1 or more sulfonic groups and the sum of the number of the mercaptocarbonyl groups and the number of the carboxyl groups is equal to or greater than the number of sulfonic groups;

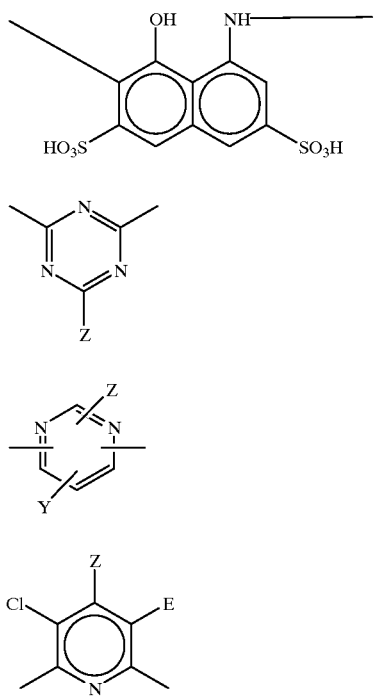

(1)

(2)

(3)

(4)

wherein in formulas (2) to (4), Z is $NR^1R^2$, $SR^3$, or $OR^3$; Y is hydrogen, chlorine, Z, $SR^4$, or $OR^4$; E is chlorine or a cyano group; $R^1$ and $R^2$ are each independently hydrogen, an alkyl group, substituted alkyl group, alkenyl group, substituted alkenyl group, aralkyl group, or substituted aralkyl group or a group constituting a 5- or 6-member ring together with a nitrogen atom; and $R^3$ and $R^4$ are each independently hydrogen, an alkyl group, substituted alkyl group, alkenyl group, substituted alkenyl group, aralkyl group, or substituted aralkyl group;

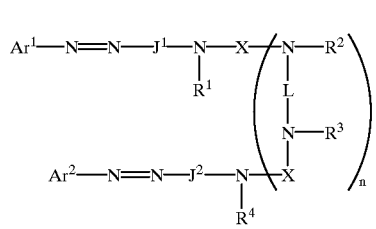

(VI)

wherein, $Ar^1$ and $Ar^2$ are each independently an aryl group, or substituted aryl group; a least one of $Ar^1$ and $Ar^2$ has at least one substituent selected from the group consisting of a mercaptocarbonyl group and a carboxyl group; $J^1$ and $J^2$ are each independently a group represented by formulas (1) to (3) described below; $R^1$, $R^2$, $R^3$, and $R^4$ are each independently hydrogen, an alkyl group, or substituted alkyl group; L is a divalent organic bonding group; n is 0 or 1; X is independently a carbonyl group or a group represented by formulas (4) to (6) described below, and general formula (VI) has 1 or more carboxyl groups; and when general formula (VI) does not have a sulfonic group, the sum of the number of the mercaptocarbonyl group and the number of the carboxyl group is two or more and when general formula (VI) has a sulfonic group, the sum of the number of the mercaptocarbonyl groups and the number of the carboxyl groups is equal to or greater than the number of the sulfonic groups:

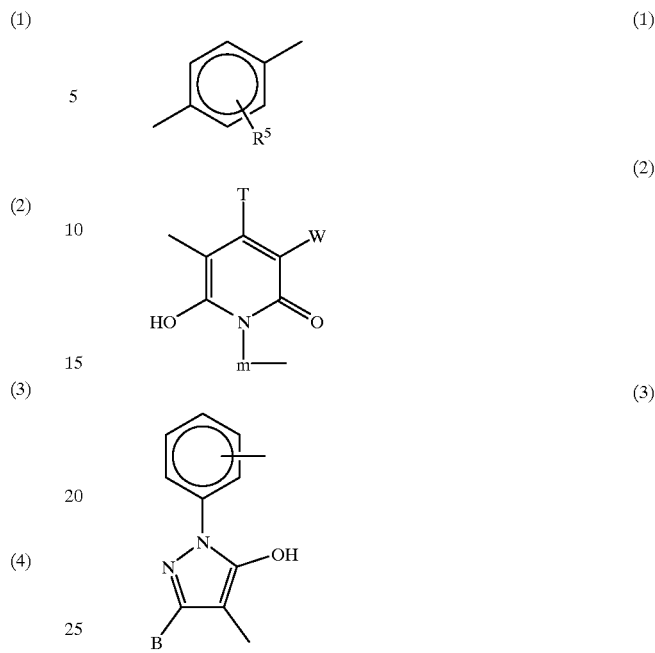

(1)

(2)

(3)

wherein in formulas (1) to (3), $R^5$ is a group selected from the group consisting of hydrogen, an alkyl group, substituted alkyl group, alkoxyhalogen, cyano group, ureido, and $NHCOR^6$; $R^6$ is hydrogen, an alkyl group, substituted alkyl group, aryl group, substituted aryl group, aralkyl group, or a substituted aralkyl group; T is an alkyl group; W is a group selected from the group consisting of hydrogen, a cyano group, $CONR^{10}R^{11}$, pyridinium group, and a carboxyl group; m is a $C_2$ to $C_8$ alkylene chain; B is hydrogen, an alkyl group, or carboxyl group; and $R^{10}$ and $R^{11}$ are each independently hydrogen, an alkyl group, or substituted alkyl group:

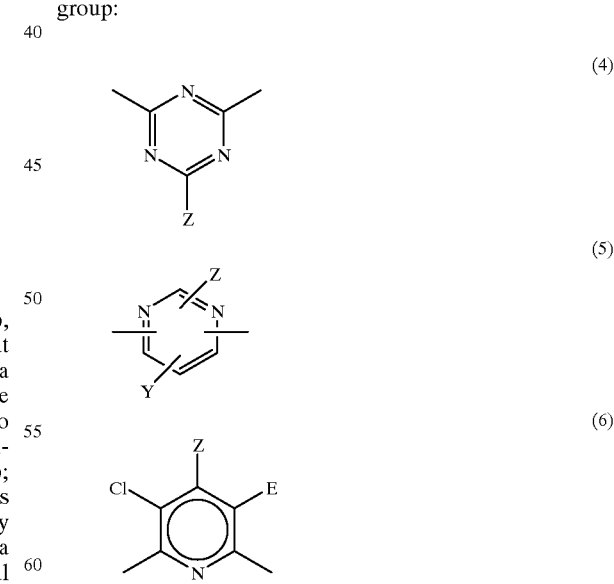

(4)

(5)

(6)

wherein in formulas (4) to (6); Z is $OR^7$, $SR^7$, or $NR^8R^9$; Y is hydrogen, chlorine, or a cyano group; E is chlorine or a cyano group; $R^7$ is hydrogen, an alkyl group, substituted alkyl group, alkenyl group, substituted alkenyl group, aryl group, substituted aryl group, aralkyl group, or substituted aralkyl group; $R^8$ and $R^9$ are each independently hydrogen, an alkyl group, substituted alkyl group, alkenyl group, substituted alkenyl group, aryl group, substituted aryl group, aralkyl group or substituted aralkyl group, or a group constituting a 5-or 6-member ring together with a nitrogen atom;

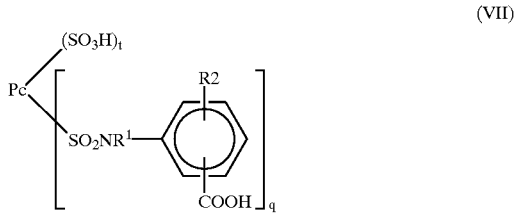

(VII)

wherein Pc is a phthalocyanine nucleus containing metal; $R^1$ is hydrogen, an alkyl group, substituted alkyl group, alkenyl group, substituted alkenyl group, aralkyl group, or substituted aralkyl group; $R^2$ is hydrogen, an alkyl group, alkoxyl group, halogen atom, amino group, or substituted amino group; t+q is 3 to 4; and q is 1 or more; and

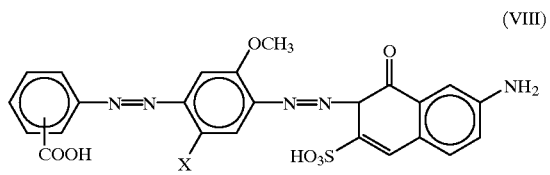

(VIII)

wherein X is hydrogen, a carboxyl group, sulfonic group, alkyl group, substituted alkyl group, alkenyl group, substituted alkenyl group, aralkyl group, or substituted aralkyl group.

11. The ink jet recording ink according to claim 1, wherein the content of said dye is from 0.3 to 10% by weight.

12. The ink jet recording ink according to claim 1, wherein the content of said water-soluble organic solvent is from 3 to 40% by weight.

13. The ink jet recording ink according to claim 1, wherein said water-soluble organic solvent comprises at least one compound selected from the group consisting of polyhydric alcohols, polyglycols, and polyglycol ethers.

14. The ink jet recording ink according to claim 1 which further comprises a surfactant.

15. An ink jet recording method in which the droplets of the ink jet recording ink of claim 1 are discharged from an orifice according to a recording signal to record an image.

16. The ink jet recording method according to claim 15, wherein said ink droplets are formed by heating the ink.

17. The ink jet recording method according to claim 16, wherein said ink droplets are formed by applying a plurality of pulses to a heating means which heats the ink.

18. The ink jet recording method according to claim 16, which comprises a process in which said ink droplets are discharged from an orifice according to said recording signal to conduct recording on a printing medium and a process in which predischarge is conducted without recording.

19. The ink jet recording ink according to claim 1, wherein $R^2$ is a functional group selected from the group consisting of a carboxyl group, a sulfonic group, a salt of a carboxyl group, and a salt of a sulfonic group.

20. The ink jet recording ink according to claim 1, wherein at least one of $R^2$ and $R^3$ is a hydroxyl group.

* * * * *